Feb. 1, 1955    T. A. WIEDEMANN    2,701,017
HIGH-SPEED FOLLOWER GAUGE AND PUNCH
Filed Sept. 22, 1950    13 Sheets-Sheet 3

INVENTOR
Theodore A. Wiedemann.
BY
ATTORNEYS

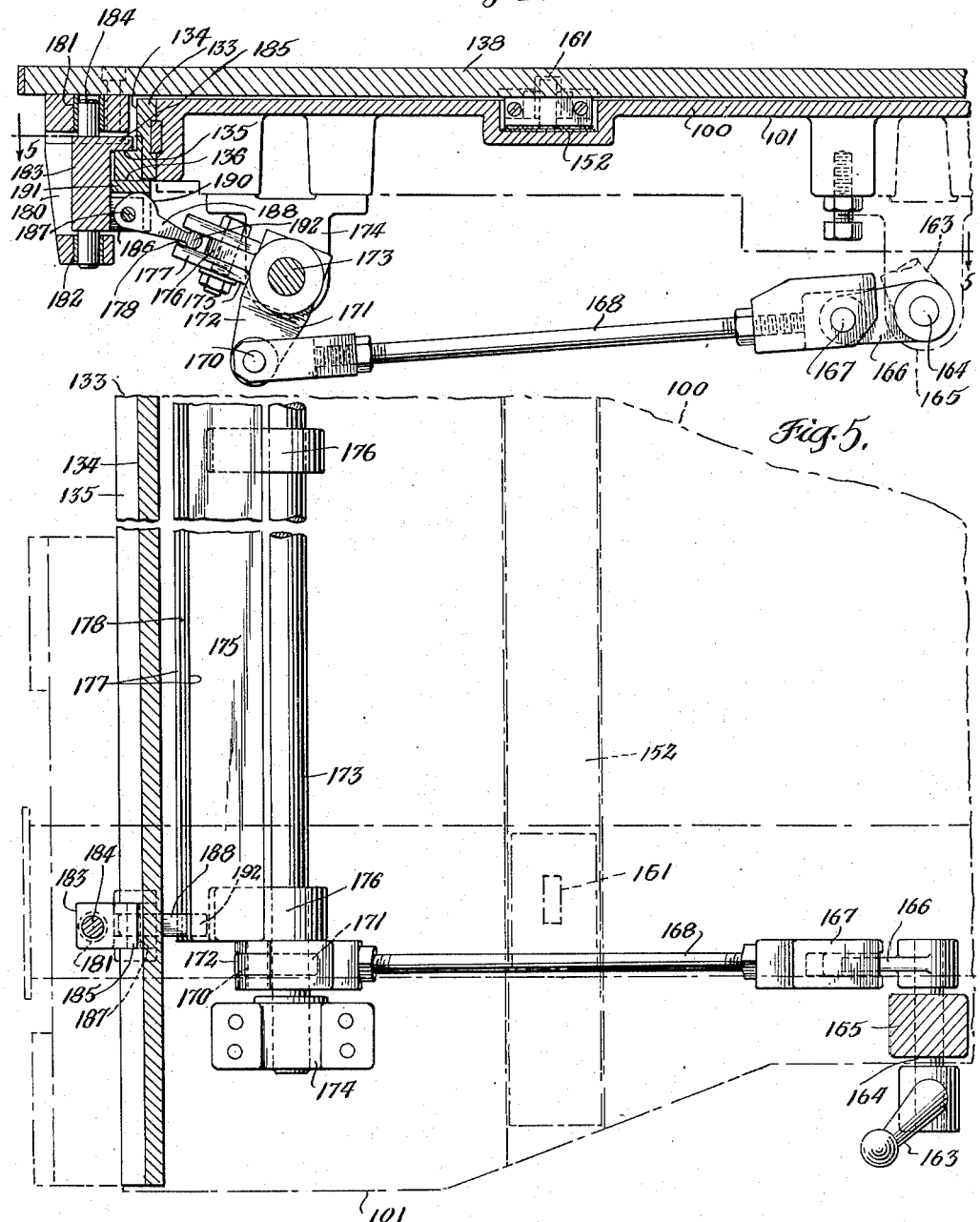

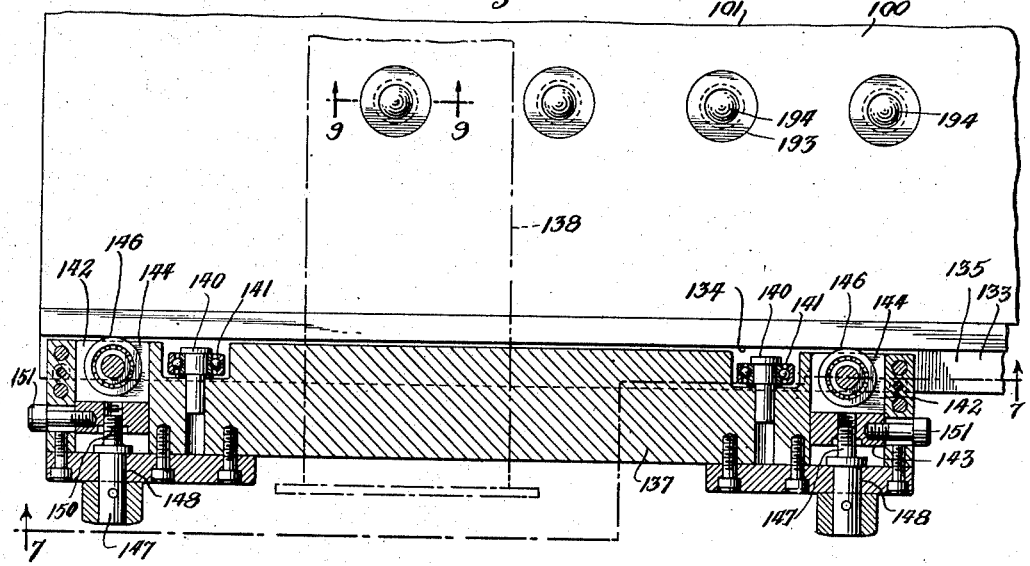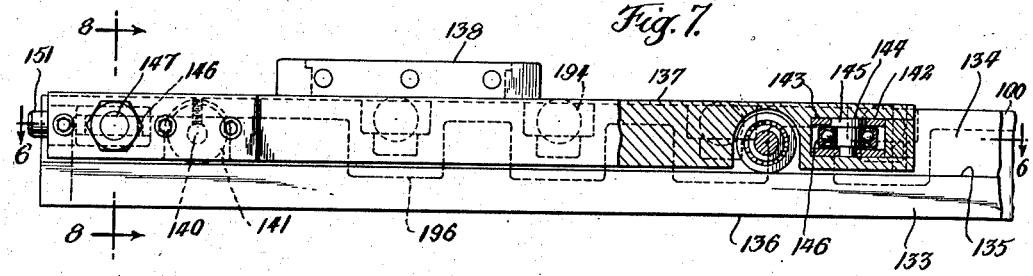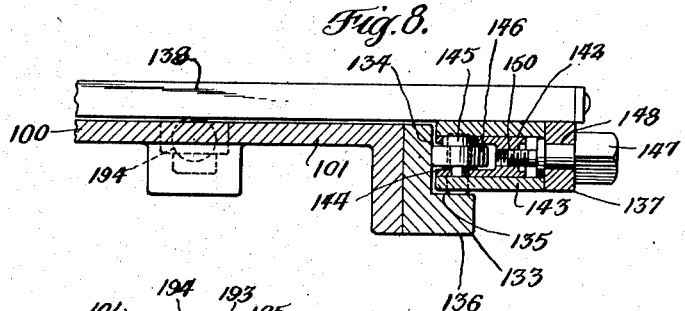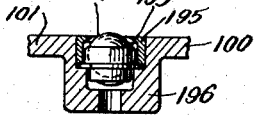

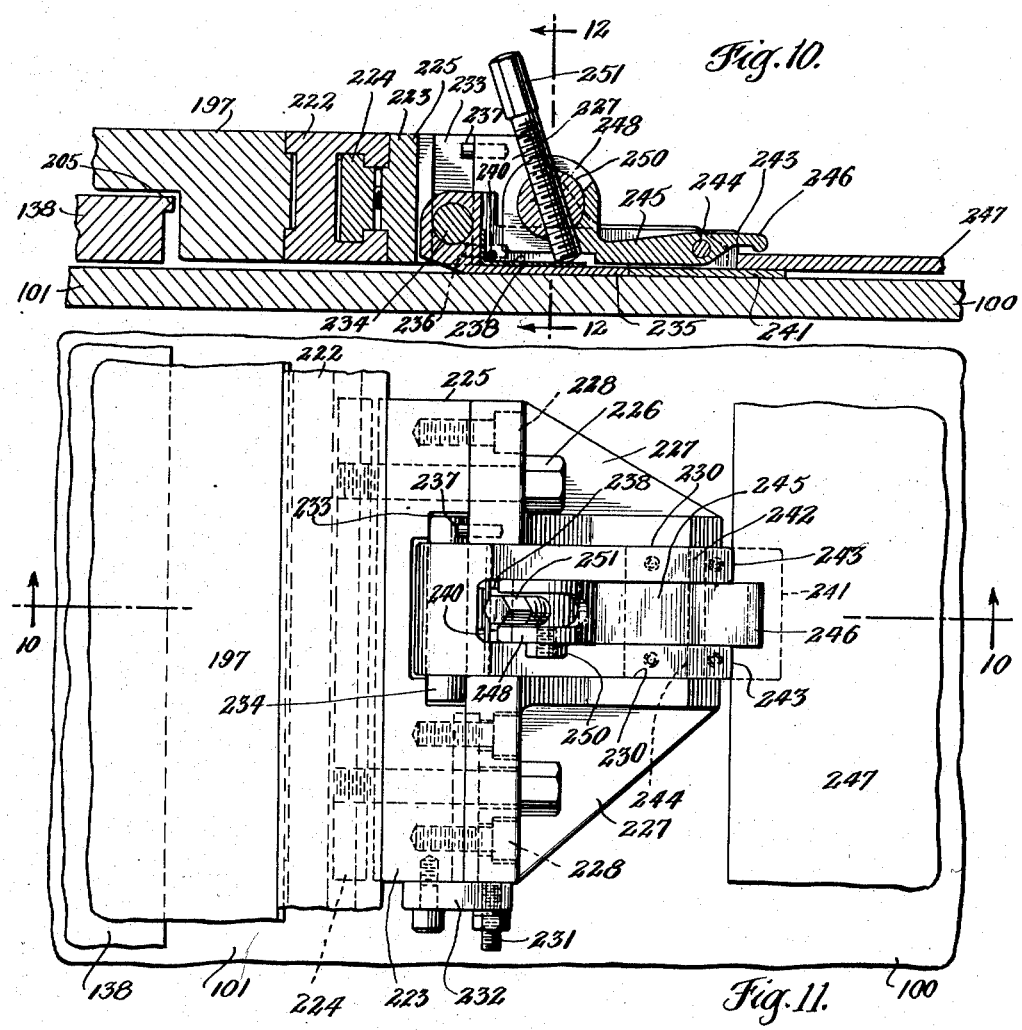

Feb. 1, 1955　　　T. A. WIEDEMANN　　　2,701,017
HIGH-SPEED FOLLOWER GAUGE AND PUNCH
Filed Sept. 22, 1950　　　　　　　　13 Sheets-Sheet 7
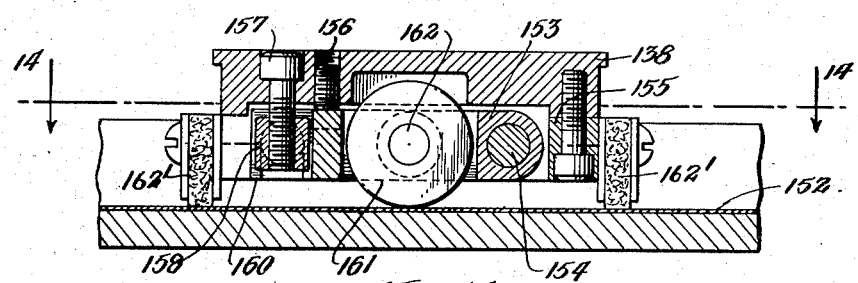
Fig. 13.
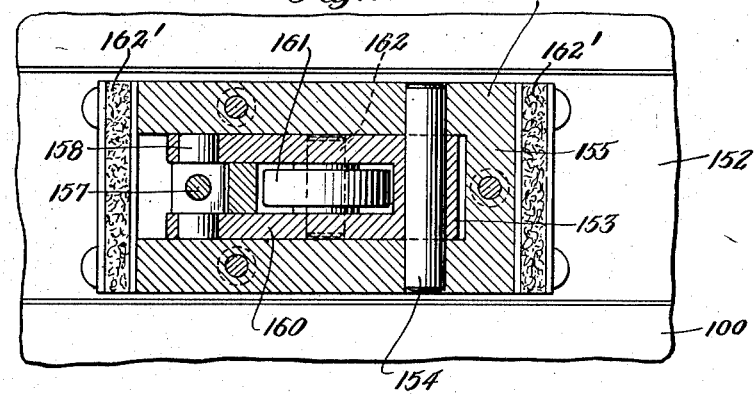
Fig. 14.
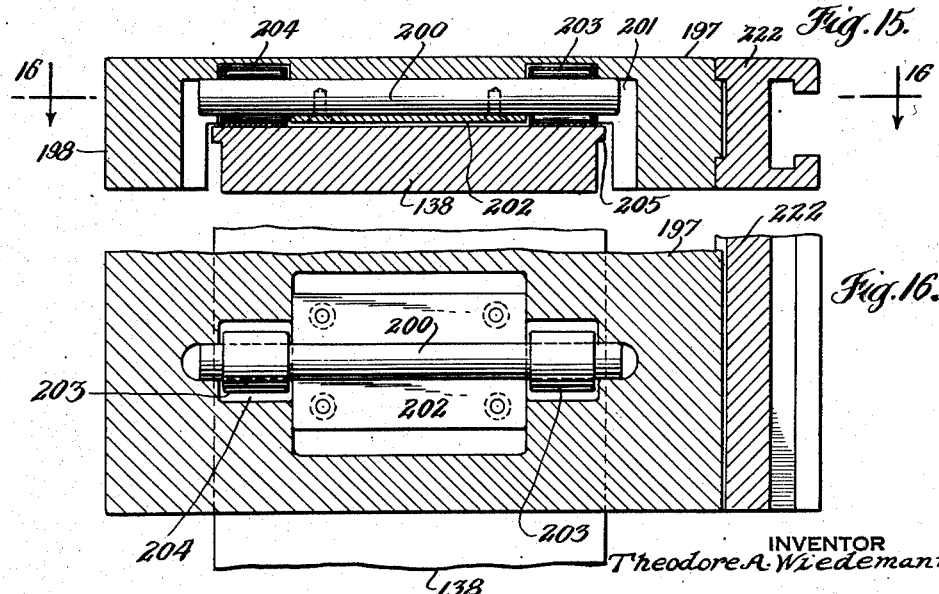
Fig. 15.
Fig. 16.
INVENTOR
Theodore A. Wiedemann.
BY
ATTORNEYS Feb. 1, 1955 T. A. WIEDEMANN 2,701,017
HIGH-SPEED FOLLOWER GAUGE AND PUNCH
Filed Sept. 22, 1950 13 Sheets-Sheet 8
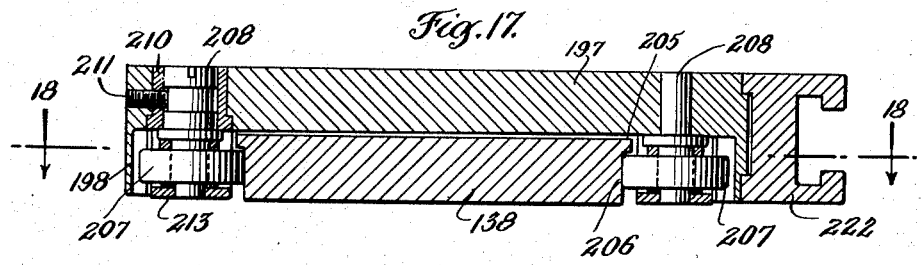
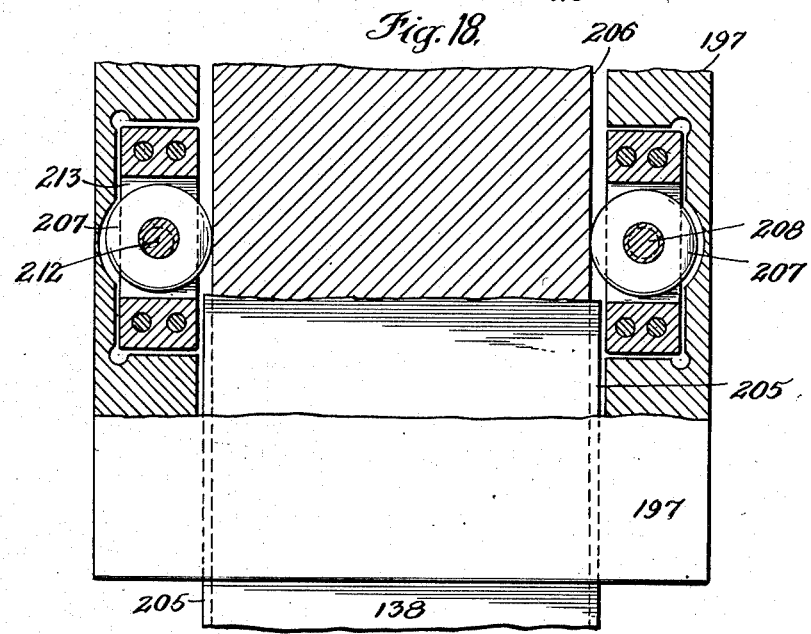
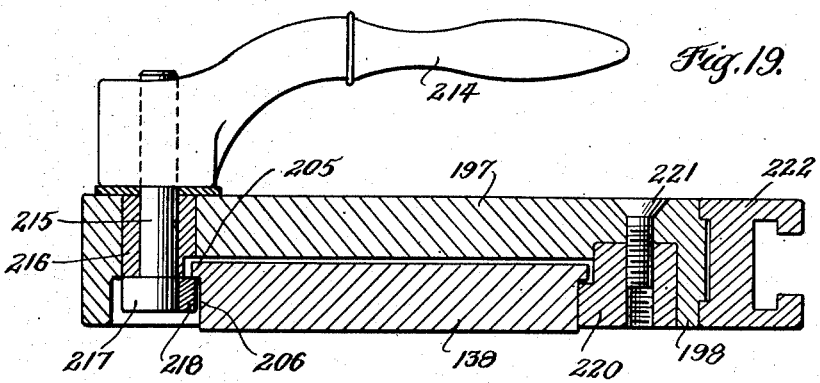
INVENTOR
Theodore A. Wiedemann.
BY
ATTORNEYS Feb. 1, 1955     T. A. WIEDEMANN     2,701,017
HIGH-SPEED FOLLOWER GAUGE AND PUNCH
Filed Sept. 22, 1950     13 Sheets-Sheet 9

INVENTOR
Theodore A. Wiedemann.
BY
ATTORNEYS

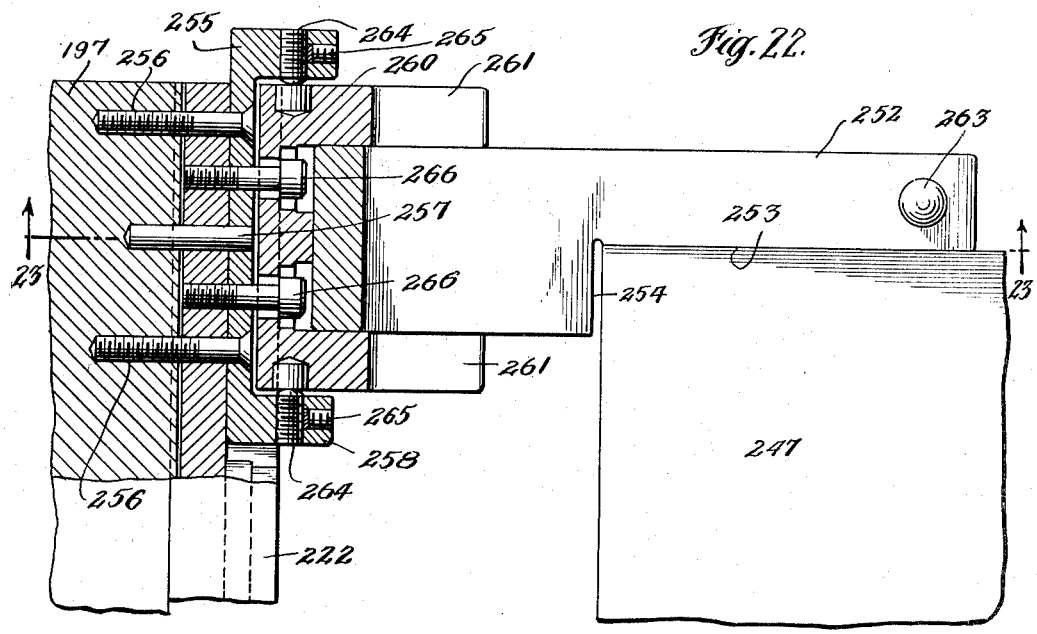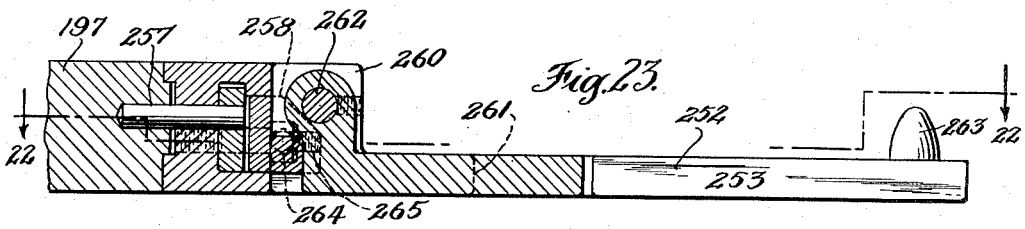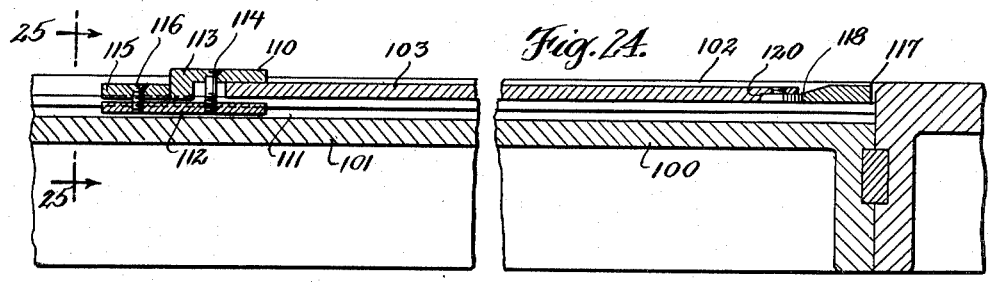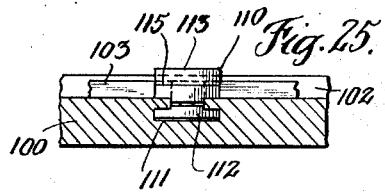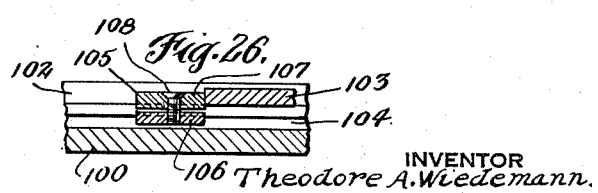

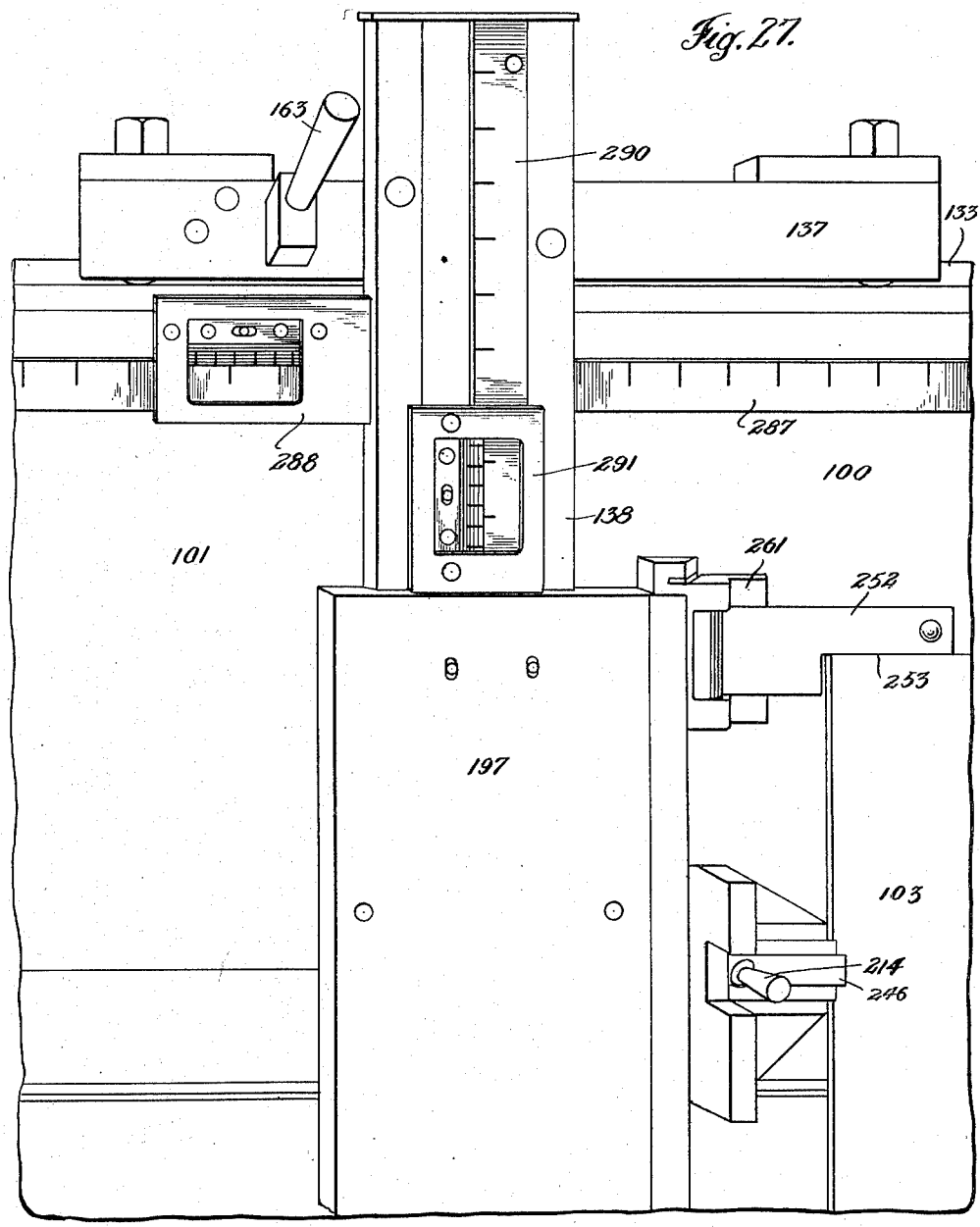

Feb. 1, 1955     T. A. WIEDEMANN     2,701,017
HIGH-SPEED FOLLOWER GAUGE AND PUNCH
Filed Sept. 22, 1950     13 Sheets-Sheet 12
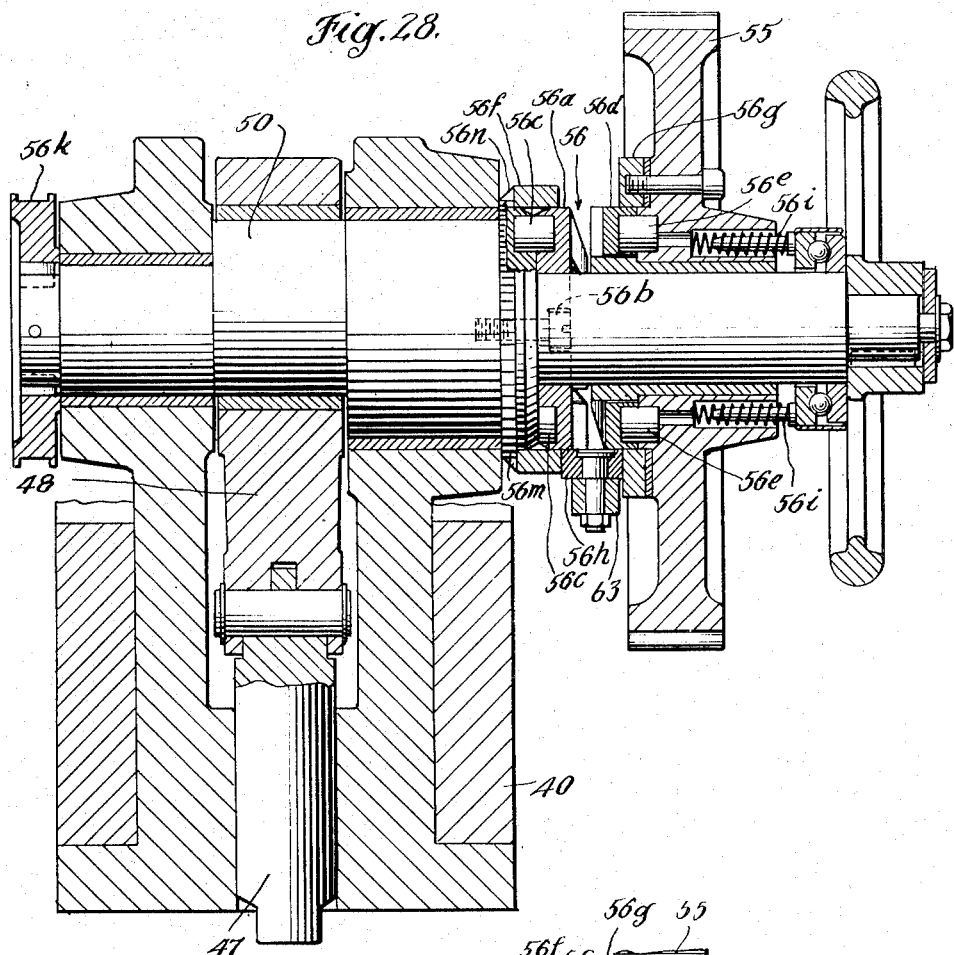
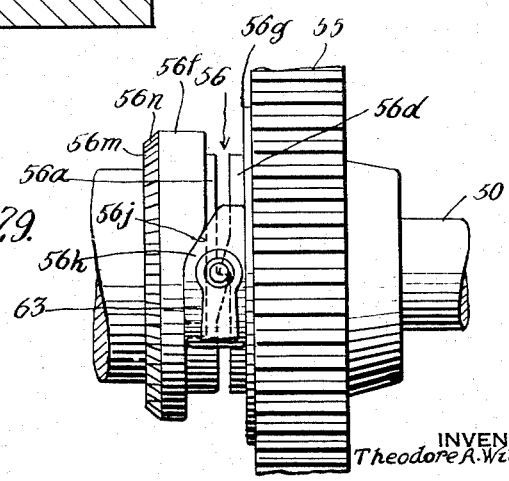
INVENTOR
Theodore A. Wiedemann.
BY
ATTORNEYS.

United States Patent Office 2,701,017
Patented Feb. 1, 1955

2,701,017

HIGH-SPEED FOLLOWER GAUGE AND PUNCH

Theodore A. Wiedemann, Norristown, Pa., assignor to Wiedemann Machine Company, Philadelphia, Pa., a corporation of Pennsylvania Application September 22, 1950, Serial No. 186,160

23 Claims. (Cl. 164—86)

The present invention relates to a high speed follower gauge and to the combination of such a gauge with a machine tool, especially a turret punch press.

This application has been divided, and a divisional application on the trolley structure has been filed, Serial No. 381,058, filed September 18, 1953, for High Speed Follower Gauge Trolley Structure.

A purpose of the invention is to facilitate the manipulation of the work on a work table by supporting the work on a cross slide mounted on a slidable gauge bar.

A further purpose is to improve the flatness of thin punched sheets.

A further purpose is to position a template in fixed position on a table bed, to provide rails on either side of the bed, to extend a gauge bar over the bed and slidable on the rails, to mount a cross slide slidable on the gauge bar, to clamp the work on the cross slide and to position a stylus on the cross slide which registers with points on the template.

A further purpose is to provide uniform openings in the template and to extend the stylus in snugly fitting relationship into the openings.

A further purpose is to provide a longitudinal template locating wall on the table bed having a longitudinal template locating surface parallel to the gauge bar, to provide a transverse template locating wall on the bed having a transverse template locating surface, to mount a template in fixed relation to the bed engaging the longitudinal and transverse template locating surfaces, to provide a longitudinal work locating wall on the cross slide having a longitudinal work locating surface parallel to the gauge bar whose projected distance from the center of the stylus is the same as the projected distance from the longitudinal template locating surface to the tool axis, and to provide a lateral work locating wall on the cross slide having a lateral work locating surface whose projected distance from the stylus is equal to the projected distance from the lateral template locating surface to the tool axis.

A further purpose is to measure the dimension from the stylus to the longitudinal work locating surface oppositely from the dimension from the axis to the longitudinal template locating surface, and to measure the dimension from the stylus to the lateral work locating surface oppositely from the dimension from the axis to the lateral template locating surface.

A further purpose is to mount a punch turret on a vertical pivot adjoining the table with a plurality of punches around the punch turret, to mount a die turret on a vertical pivot below the punch turret with a plurality of cooperating dies around the die turret, and to provide for centering the punch and die turret together on the same punch axis which bears the relation to the respective locating surfaces as above described.

A further purpose is to mount the stylus in a sliding guide which permits the stylus to be depressed into a selected opening of the template and preferably to close an electric switch operating the machine tool when the stylus is depressed.

A further purpose is to provide a clamp for locating the gauge bar in any desired position on the rails.

A further purpose is to provide a clamp for locking the cross slide at any desired position on the gauge bar.

A further purpose is to employ a plurality of openings on the template all of the same size, some of which indicate holes in the work of one size and others of another size, and to provide common indicia on the openings in the template which indicate holes in the work of a given size.

A further purpose is to interconnect by a line all openings in the template which indicate holes in the work of a given character.

A further purpose is to coordinate the indicia on the individual punch positions of the punch turret with the indicia of the openings in the template which correspond to holes in the work to be made by the particular punch.

A further purpose is to provide rails at either side of the bed having upwardly directed surfaces and laterally directed surfaces, to mount trolleys supporting the gauge bar and cooperating with the rails, to position first spaced rollers on each trolley engaging the upwardly directed rail surfaces and to position second spaced rollers on each trolley engaging the laterally directed rail surfaces, desirably with slide adjustments for the second rollers toward and away from the laterally directed rail surfaces.

A further purpose is to provide gauge bar tracks beneath the gauge bar and third rollers on the gauge bar engaging the gauge bar tracks, preferably mounting the third rollers in adjustable cradles.

A further purpose is to mount axles beneath the cross slide and rollers on the axles engaging an upwardly directed surface of the gauge bar.

A further purpose is to mount work clamp holders on the cross slide having clamp guideways extending away from the table bed and to position work clamps free to move in the clamp guideways to permit yielding of the work clamp away from the table during extraction of the punch.

A further purpose is to provide walls on the cross slide having longitudinally work locating surfaces, pivoted jaws extending out beyond the work locating surfaces and connected to the cross slide, a trunnion on each pair of jaws, and a quick action clamp screw threaded through each trunnion and applying pressure between the jaws.

A further purpose is to extend clamp jaws on opposite sides of one of the rails, and to manipulate the clamp jaws by a cam lever whose lever arm rides a slot in a crank operatively moved to clamp the gauge bar.

A further purpose is to mount a pivoted clamping handle on the cross slide and to extend a clamping cam from the handle which brings pressure against the gauge bar.

A further purpose is to position a lateral work located wall having a lateral work locating surface on the cross slide, preferably to make the wall laterally adjustable with respect to the cross slide, and preferably also to make the wall swingable toward and away from the table.

A further purpose is to permit making of the template in the same machine by mounting it in the work clamps and by providing cooperating scales and indexes between the gauge bar and the bed and between the cross slide and the gauge bar for location of the point at which the template is to be punched.

A further purpose is to provide precise adjustment, both for set-up purposes and to compensate for wear, on all of the units of the machine which require adjustment.

Further purposes appear in the specification and in the claims.

In the drawings I have chosen to illustrate one only of the numerous embodiments in which my invention may appear, with a variation, the form and variation shown being chosen from the standpoints of convenience in illustration, satisfactory operation and clear demonstration of the principles involved.

Figure 4 is an enlarged fragmentary section taken on the line 4—4 of Figure 2 and showing the clamp for the gauge bar.

Figure 5 is a plan section of the clamp taken on the line 5—5 of Figure 4 with certain parts located above the plane of the section appearing in dot-and-dash lines.

Figure 6 is an enlarged plan section of one of the trolleys employed in the machine of the invention, the section being taken on the line 6—6 of Figure 7, and the gauge bar being located in dot-and-dash lines.

Figure 7 is partially a side elevation of Figure 6 and partially a section on the line 7—7 of Figure 6.

Figure 8 is a cross section on the line 8—8 of Figure 7.

Figure 9 is a fragmentary section on the line 9—9 of Figure 6.

Figure 10 is a fragmentary cross section through one of the work clamps on the line 10—10 of Figure 11.

Figure 11 is a plan view of Figure 10.

Figure 12 is a cross section of the work clamp only on the line 12—12 of Figure 10.

Figure 13 is an enlarged cross section of a roller support and track on the line 13—13 of Figure 2.

Figure 14 is a plan section on the line 14—14 of Figure 13.

Figure 15 is an enlarged section of the cross slide on the line 15—15 of Figure 2.

Figure 16 is a plan section on the line 16—16 of Figure 15.

Figure 17 is an enlarged cross section at another cross slide position taken on the line 17—17 of Figure 2.

Figure 18 is a plan section taken on the line 18—18 of Figure 17.

Figure 19 is an enlarged cross section of the cross slide taken on the line 19—19 of Figure 2.

Figure 22 is an enlarged plan section of a lateral work locating wall taken on the line 22—22 of Figure 23.

Figure 23 is a cross section taken on the line 23—23 of Figure 22.

Figure 24 is an enlarged broken section of the template guiding and clamping mechanism taken on the line 24—24 of Figure 3.

Figure 25 is a cross section taken on the line 25—25 of Figure 24.

Figure 26 is a cross section of another guiding mechanism taken on the line 26—26 of Figure 3.

Figure 27 is a fragmentary plan view of a variation in the invention, showing the making of a template.

Figure 28 is a fragmentary cross section, taken on the line 28—28 of Figure 1, of a clutch mechanism employed in the machine.

Figure 29 is a fragmentary view, looking up in Figure 28 of the clutch actuating shoe and associated cam surface of the clutch.

Figure 1:
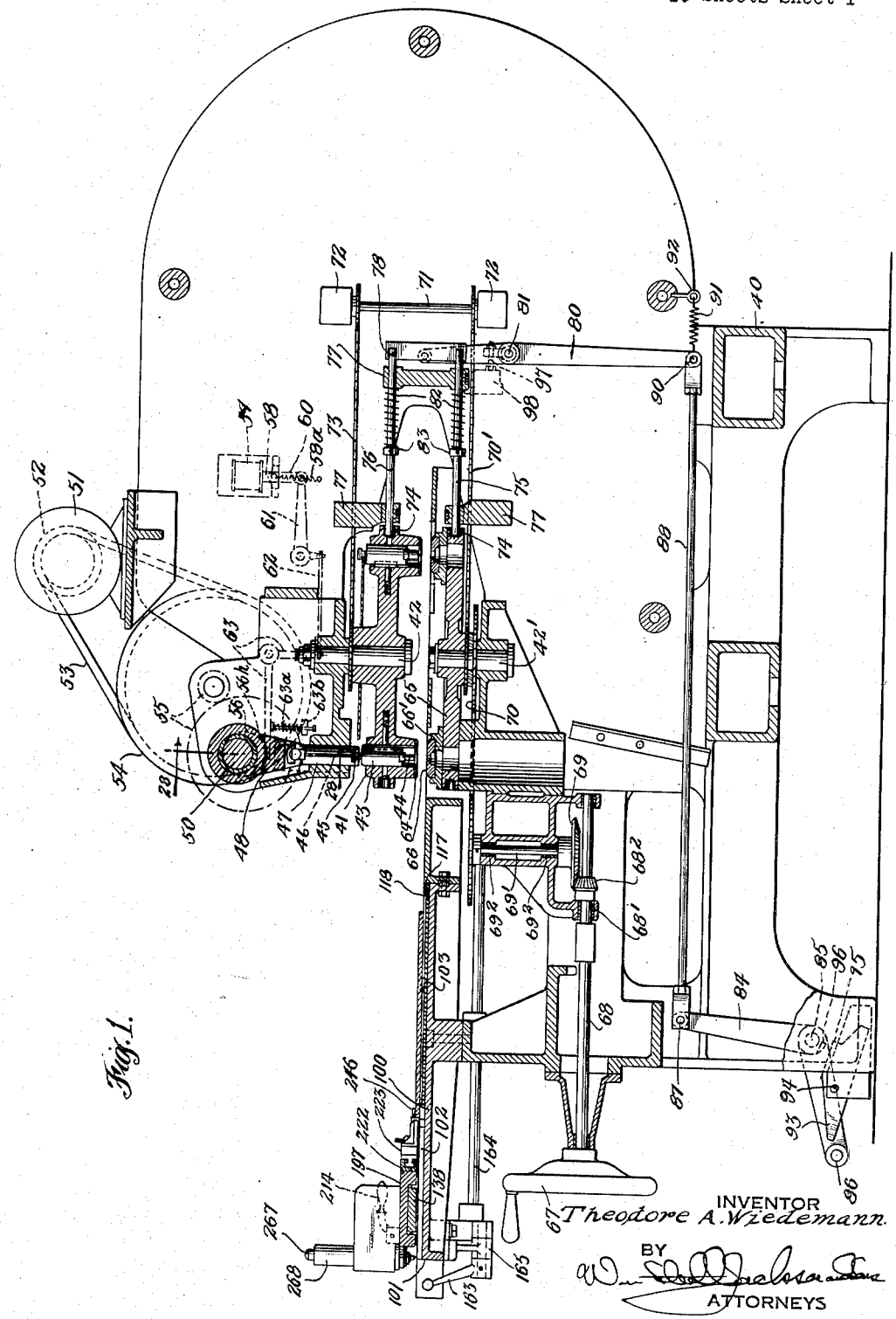
Figure 1 is a vertical sectional elevation of a machine constructed in accordance with the invention, the section being taken on the line 1—1 of Figure 2.

Describing in illustration but not in limitation and referring to the drawings:

In machine operations especially those of instantaneous character, such as punching, but permissibly also in drilling, routing, milling and other operations, it is very desirable to obtain high production rates without the necessity of building very expensive production tools such as ganged punches and other production tool set-ups. The present invention makes it possible to locate points of machining, such as punching, with great accuracy and speed. The work is supported in work holders on a cross slide which is slidable laterally on a gauge bar, and the gauge bar in turn is slidable longitudinally on side rails and desirably with auxiliary support from tracks. The position of the work at any operation is determined by a stylus which moves over a template fixed on the bed of the work table. The template carries indications, suitably holes, which designate the center on which any machining operation is to be performed, and the stylus, by location over the designated position on the template, automatically locates the work correspondingly for performing a particular work operation at the machine tool work axis.

In the preferred embodiment, the machine tool is a turret tool, preferably a turret punch press, which has a multiplicity of punches and a multiplicity of dies in cooperating turrets which turn to bring any selected combination of punch and die to the desired work axis where the operation is to be performed. Since each of the turret positions will normally contain a punch and a cooperating die of a different size (this includes of course the possibility that each punch and die set may be of a different shape), the designations on the template will in some cases be designations of successive operations to be performed with a punch or other tool of the same size, and in other cases will be designations of operations to be performed with different punches and dies. In the preferred embodiment the indications of location on the template are all the same, suitably all being holes of the same size, and all being adapted to receive the same stylus, but differences as to the character of the work operation to be performed at each location are made by indicia on the template.

Thus all the template locations which are to indicate the locations of holes in the work of a given size have the same indicia and all those which are to indicate the locations of holes in the work of a different size have different indicia. The preferred indicia are colors, although of course they can be any other suitable indications such as numbers, letters, or symbols. Thus in one example all of the openings on the template which correspond to work holes of one size are surrounded by red spots and all of those which correspond to the locations of holes in the work of a different size are surrounded by blue spots, and so on throughout the different punches which are to be used.

To speed up the motion from one location of a hole made by a given punch to another location of a hole made by the same punch, connecting lines are employed on the template, and these connecting lines are preferably of the same color as the indicia at the locations on the template for that punch. Thus for example, for a given size punch there will be red spots around the template holes and a red line connecting the holes and indicating the most convenient order of succession of punching.

To aid in changing punches with maximum rapidity, the same indicia which appears on the template also appears on the turret at the punch position, so that if the indicia on the template is red, a red spot or indication appears at that punch position on the turret, and a blue spot appears on the turret position for the punch whose indicia on the template is blue, and so on.

The trolleys at the ends of the gauge bar are desirably provided with rollers bearing down on the rails and rollers bearing in on the rails from the side, the side rollers being adjustable. To guard against undue flexibility of the gauge bar, tracks are provided on the bed which are engaged by rollers located between the trolleys.

The cross slide is provided with axles which carry rollers riding on the top of the gauge bar and also with rollers suitably adjustable in spacing which ride the sides of the gauge bar.

Provision is made to allow the work clamp to yield upwardly while the punch is stripping from the work, thus minimizing the distortion of the work and producing a maximum of flatness in the punched product. The work clamp is desirably a pair of clamping jaws, one of which carries a trunnion through which a clamping screw is threaded to engage the jaws and provide for quick clamping and unclamping.

On one of the rails a clamping jaw rides which is operated by a lever cam, which in turn rides in a slot of a crank as the gauge bar moves longitudinally. A clamping cam accomplishes the clamping of the cross slide on the gauge bar.

The cross slide has a lateral work locating wall which is adjustable with respect to the cross slide and desirably swingable away from the table.

Where it is desired to make the template by punching, scales suitably equipped with verniers are provided between the gauge bar and the bed and between the cross slide and the gauge bar.

While the invention is believed to find its widest application in turret punch presses, it will be understood that it can be employed in any machining operation where a predetermined location is to be achieved on work controlled by a template, whether the ultimate machining operation be sewing, drilling, milling or any other suitable operation which can be performed on sheet work.

Considering now the form shown in the drawings, a frame 40 supports a punch turret 41 which as shown turns on a vertical pivot 42. At circumferentially spaced positions around the punch turret are mounted punch holders 43 containing punches 44, which will suitably be different, although there may in individual cases be recurring punches of the same character. Each of the punches has a T head 45 (Figure 1) at the top, which, when in a position aligning with the punching axis indicated at 46 in Figures 1, 2 and 3, engages with a punch ram 47 (Figure 1) actuated by a connecting rod 48 from a crank 50 driven by a motor 51 through a pulley 52 and belt 53 to a driven pulley 54 and then through gearing 55 to a clutch 56 such as shown in Figures 28 and 29 engaged by solenoid 57 operating through armature 58 and link 60 to bell crank 61, chain link 62 and bell crank 63 engaging the clutch. It will be understood that the motor, pulleys and gears turn all the time during normal operation and the punch operates whenever the clutch engages to drive the crank and operate the ram 47.

Referring to Figures 28 and 29, the clutch 56 comprises a toothed clutch member 56$^a$ connected to the crank shaft by screws 56$^b$ and torque pins 56$^c$, a toothed clutch member 56$^d$ connected to the drive gear 55 by screws and torque pins 56$^e$, an adjustable cam ring 56$^f$ surrounding the clutch member 56 and rotatable therewith, a ring 56$^g$ screwed to the drive gear 55 and a segmental shoe 56$^h$ carried by the bell crank 63. In Figure 28 the clutch is shown in its disengaged position which is when the solenoid 57 is deenergized and its armature 58 is pulled down by the spring 58$^a$ (see Figure 1). In this position a spring 63$^a$ reacting from a bracket 63$^b$ on the frame holds the horizontal arm of the bell crank 63 upwardly so that the shoe 56$^h$ is held between the side faces of the rings 56$^f$ and 56$^g$ to keep the clutch teeth apart. When the solenoid is energized the shoe moves down and the springs 56$^i$ move the clutch member 56$^a$ of the drive wheel into engagement with the clutch member 56$^a$ to effect drive of the crank shaft. In the position of Figure 29 the clutch is shown engaged and the cam ring 56$^f$ is shown in the position it assumes after the crank has made approximately one-half a revolution which is the end of the down punching stroke. As the crank shaft continues to rotate the cam surface 56$^i$ engages the sloping surface of the segmental shoe and then the drive gear is moved to the right to disengage the clutch, this taking place in the second half of the revolution of the crank shaft. A brake may be applied to the drum 56$^d$ to stop the crank shaft when the punch ram is at the top of its stroke. The cam ring may be adjusted by moving it axially out of contact with the notches 56$^m$ on the crank shaft and rotating at the desired amount and then moving it back into engagement with the notches again, it being noted that the ring has teeth 56$^n$ for engaging the notches 56$^m$.

Immediately below each punch at the appropriate position on the punch turret is a stripper 64.

Suitably coaxial with the punching turret is a die turret 65 on a vertical pivot 42' having at circumferentially displaced positions dies 66, mounted in die holders 66', which cooperate with the respective punches. It will be understood that at each circumferential position there is a punch and die, and that these are brought into punching relationship when the turrets are turned to bring these tools into the tool axis 46.

The turrets are turned together in any well known manner which keeps both in the same angular relationship and brings any desired die set into the active position. As shown a hand wheel 67 (Figure 1) turns a shaft 68 mounted in bearings 68' in the frame 40. The shaft carries a bevelled gear 68$^2$ which intermeshes with cooperating bevel gear 69 on the lower end of shaft 69' mounted vertically in bearings 69$^2$ on the frame 40. The shaft 69' intermeshes through a chain drive 70 with the pivot 42' on the die turret and the punch turret is turned in step with the die turret by a chain drive 70' intermeshing with shaft 71 on the bearings 72 on the frame, which interconnect by a chain drive 73 with the punch turret pivot 42.

To assure positive registry of the punch and die turrets in any punching position, alignment sockets 74 are placed in positions diametrally opposite to each punch and die position, which receive alignment pins 75 and 76 guided in alignment bearings 77 on the frame and pivotally interconnecting at 78 with an alignment rocker 80 having fixed pivot mounting intermediate its ends at 81 on the frame 40. The alignment pins are spring urged by compression springs 82 toward their engaging position, the springs acting between the rearward alignment bearing 77 and collars 83 on the pins. The lower end of rocker 80 is moved out of engagement position by foot operated bell crank 84 having fixed pivot 85 and having a foot pedal 86 on one arm of the bell crank. The bellcrank pivotally interconnects at 87 with link 88 which pivotally interconnects at the opposite end at 90 with the lower end of rocker 80. Tension spring 91 acts between pivot 90 and spring abutment 92 to urge the rocker into the position for engagement of the pins with the turrets.

In order to lock the pins 75 and 76 out of engagement with the punch and die turrets a latch 93 is associated with the foot pedal 86. When it is desired to so lock the pins the operator depresses the foot pedal and the latch at the same time to move the tongue 95 of the latch into engagement with the notch 96 in the hub of the bell crank 84. To release the latch the foot pedal is depressed slightly and this permits the tongue 95 to drop out of the notch 96 by gravity.

An adjustable switch abutment 97 on rocker 80 engages and closes switch 98 (Figures 1 and 30), when the pins enter the turrets.

Mounted in front of the operating axis 46 of the punch is a work table 100 having a bed 101 which is suitably horizontal and supports the work and the template as later explained. The bed has a suitably recessed template well 102 (best seen in Figures 1, 2, 3, 20, 24 and 26). In normal punching operation, the well holds a template 103 desirably formed of a metal sheet (best seen in Figure 3). The template well as shown clearly in Figures 2 and 3, has lateral T grooves 104 which receive the sliding template guiding or positioning clamps 105 (Figure 26) consisting of lower tongues 106 riding the lower wide portions of the T slots, upper cooperating clamps 107 riding above the T slots and engaging the template and clamping screws 108 interconnecting the same and establishing clamping. There are also longitudinal template T slot clamps 110 (Figures 2, 3, 24 and 25) riding longitudinal T slots 111 in the template well and consisting of lower tongues 112 which ride the lower wide portions of the T slots, upper inverted L-shaped clamp portions 113 which ride above the T slot and are adapted to extend and grip above the template 103 as shown in Figure 24, and clamping screws 114 between the clamp portions and the tongues which grip the clamp in any position on the T slot and hold the template. Clamp 110 is backed up by a second clamping element 115 above the T slot which is clamped to the tongue 112 by clamping screw 116.

Figure 2:
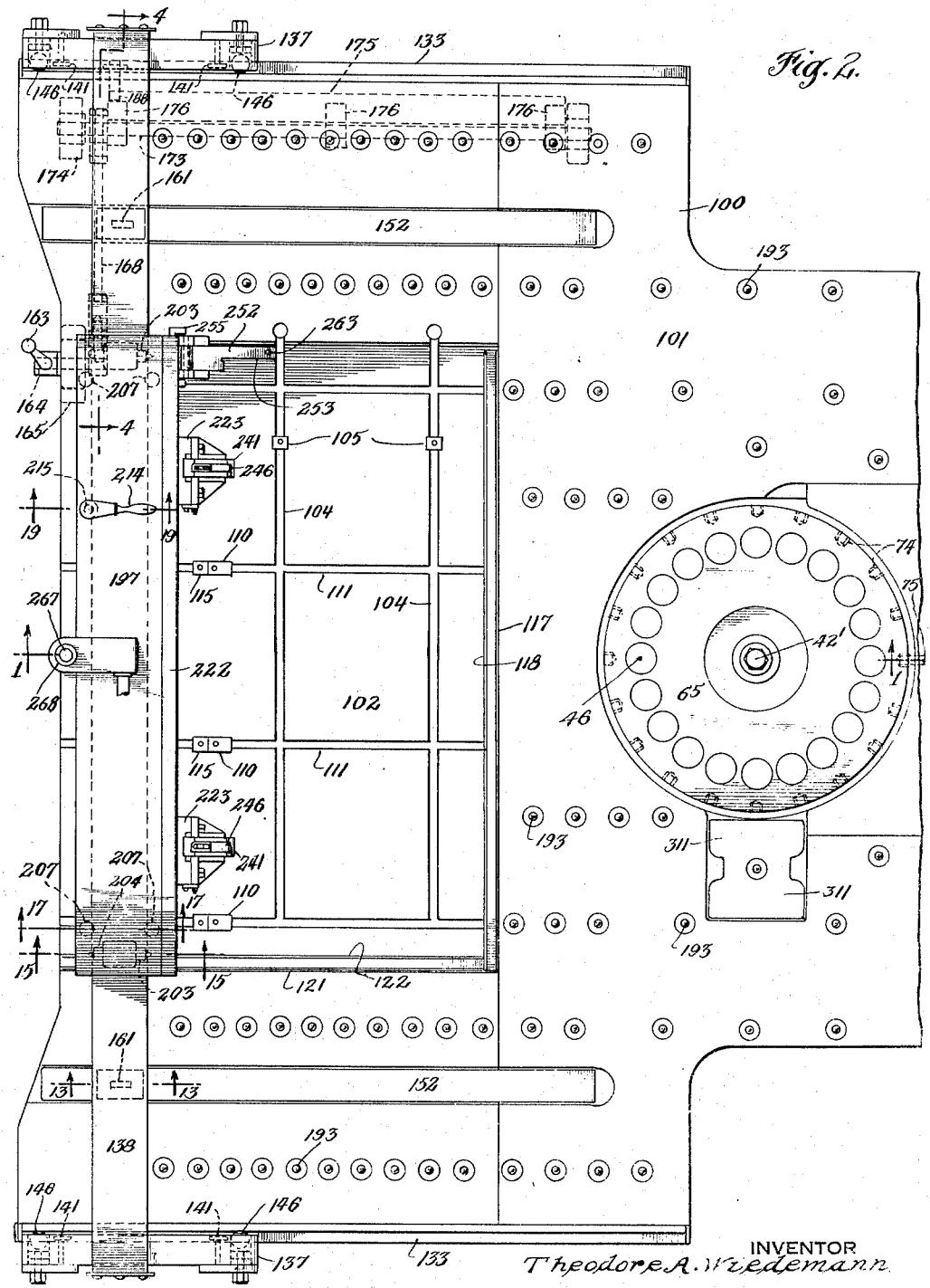
Figure 2 is a fragmentary enlarged top plan view looking down on the table level of Figure 1.
Figure 3:
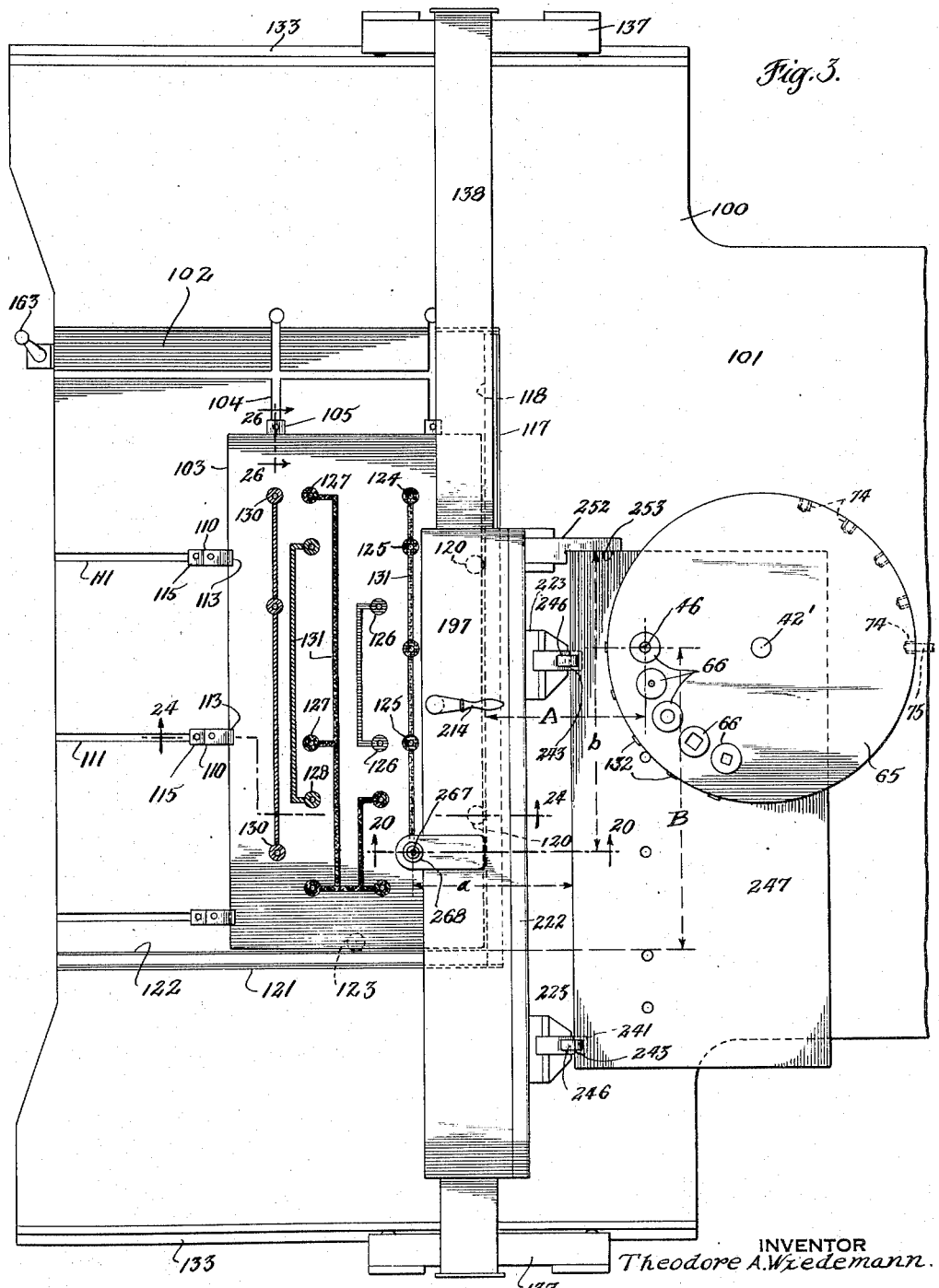
Figure 3 is a somewhat diagrammatic plan view similar to Figure 2 and showing a work piece and template in position on the table.

The template is held by the clamps against two locating surfaces. Longitudinal locating wall 117 (Figures 1, 2, 3, 20 and 24) extends across the bed rearwardly directed with respect to the punch and parallel to the transverse direction of manipulation as about to be explained. This wall has longitudinal locating surface 118 which engages the corresponding longitudinal surface on the template. To avoid unevenness in contact, the template as shown in Figure 3 is provided with contact discs 120 (suitably set in and riveted) which make contact at two points with the longitudinal locating surface. A lateral locating wall 121 extends at right angles to the longitudinal locating wall and has a lateral locating surface 122 directed toward one side of the table. The lateral locating wall engages a third locating disc 123 on the template, so that the template is completely located by the three locating points.

Figure 20:
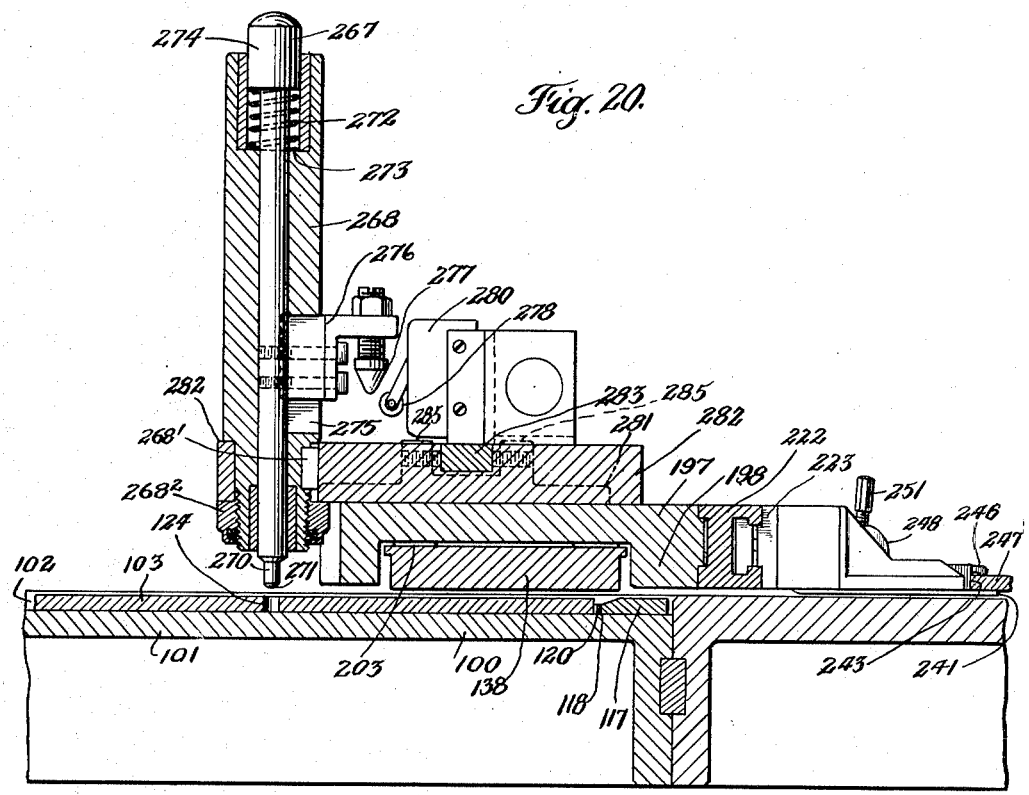
Figure 20 is an enlarged cross section through the stylus taken on the line 20—20 of Figure 3.

As best seen in Figure 3, the template has indications 124, which are suitably holes of uniform size to receive the stylus as shown in Figure 20. While the holes on the template are desirably all of one size, they correspond to different types of holes punched in the work and are suitably indicated by different indicia, conveniently different colors as shown in Figure 3. Thus the colored spots 125 around the template openings of one group correspond to one particular size of punch hole in the work, and all have the same color. The colored spots 126 correspond to a different size of punch hole in the work and have a different color. The colored spots 127 correspond to a different size of punch hole in the work and have still a different color, and the same condition holds respectively for the colored spots 128 and 130.

To aid the operator in moving the stylus quickly along the route to locate other spots having the same indicia, connecting lines 131 are provided on the template, each of which desirably has the same indicia (color) as the spots at the holes which it connects. To aid in locating the punch and dies which produces the holes corresponding to the indicia, colored spots 132 are provided at each punch and die position (Figure 3) and these indicia have the same color as the corresponding spots on the template.

It is thus evident that the template lies in fixed position on the table bed and suitably slightly below the surface so that the gauge bar can move over the bed without interference with the template.

The table has at its opposite sides fixed rails 133 extending in exact parallelism with the lateral locating surface 122 and exactly transversely to the longitudinal locating surface 118. The rails as best seen in Figures 4 to 8 inclusive are of L section, and comprise laterally (outwardly) extending surfaces 134, upwardly extending surfaces 135 and downwardly extending surfaces 136.

The rails 133 are engaged at the sides of the table by trolleys 137 which support a gauge bar 138 extending across the bed parallel to the longitudinal locating surface 118 and transverse to the rails. Each trolley has mounted at two spaced points, stub shafts 140 extending inwardly above the upwardly directed rail portion 135, and carrying precision ball bearing rollers 141 which support the weight of the trolleys and gauge bar and ride the upwardly directed portion 135 of the rails. Each trolley also has extending inwardly spaced slides 142 in guideways 143. The slides have yoke inward ends 144 and mount axles 145 which support precision ball bearing rollers 146 which ride the outwardly directed rail portions 134. The rollers 146 are subject to precise adjustment to position the trolleys and gauge bar accurately on the rails, adjusting screws 147 journalling in bearings 148 and making threaded connection with the outer portions of the yokes at 150. To hold the yokes and rollers in any adjusted position, locking screws 151 are provided at the ends in elongated slots.

At intervals between the rails, depressed tracks 152 are provided on the bed which bear part of the weight of the gauge bar. As best seen in Figures 13 and 14, the gauge bar at points cooperating with the tracks has forwardly and rearwardly extending cradles 153 pivotally mounted at 154 in a bearing support 155 secured to the bottom of the gauge bar. Each cradle is held in lower position by an adjusting screw 156 and is pulled upwardly by a clamping screw 157 extending through the gauge bar and threading at the lower end into a trunnion 158 pivotally mounted in yoke arms 160 of the cradle. Rollers 161 ride the track 152 and journal on pins 162 in the cradles. The track, rollers and cradles extend parallel with the rails. To keep the track free from grit felt wipers are provided at 162'.

The trolleys and gauge bar are clamped in any desired position by a clamping handle 163 (Figures 1, 2, 3, 4 and 5), which journals on shaft 164 in bearing 165 beneath the bed. The clamping handle 163 is connected with the clamping mechanism on the trolley by any suitable linkage, here shown to consist of crank arm 166 on the shaft 164, which pivotally connects at 167 with adjustable link 168, which at its opposite end pivotally connects at 170 with bell crank 171. Bell crank 171 is made up of crank lever 172 which engages the link shaft 173 which journals at 174 beneath the bed, and elongated bell crank lever 175 extending lengthwise of the bed and consisting of mounting prongs 176 on the shaft and spaced lever bars 177 which form an elongated slot 178 immediately inside one of the rails.

One of the trolleys as shown in Figures 4 and 5 has a bracket 180 open in the interior and provided with top and bottom aligned vertical bearings 181 and 182. A clamping member 183 has pivots 184 in the bearings 181 and 182 with sufficient freedom to move up and down for clamping. An upper jaw 185 of the clamping member 183 rides the top of the rail on the surface 135. Beneath the downwardly directed surface 136, bracket projections 186 mount a pivot 187 which pivotally supports a cam lever 188 having a cam face 190 (Figure 4) which engages and contacts a lower clamping jaw 191 cooperating with the lower surface 136 of the rail. The cam lever has a lever end 192 which rides in the elongated slot 178 of the bell crank and thus is in position for clamping action no matter where the trolleys and gauge bar move.

Distributed at intervals all over the bed in position to support the work, I provide ball anti-friction supports 193 best seen in Figures 6 and 9, each consisting of a ball 194 exposed above supporting cage 195 in a recessed socket 196 of the bed.

The gauge bar supports and guides a cross slide 197 (best seen in Figures 1, 2, 3, 10, 11, 15, 16, 17, 18, 19, 20 and 21). The cross-slide has an inverted U formation as shown in Figures 15, 17, and 19, with lateral arms 198 which extend down on the two sides of the gauge bar.

As shown in Figures 15 and 16, axles 200 are mounted on the lower side of the cross slide, in recesses 201, held by straps 202 on the cross slide. At the ends, the axles pivotally support needle bearing rollers 203 in recesses 204 of the cross slide which engage the top of the gauge bar 138 at two spaced points along the cross slide.

The sides of the gauge bar have side rims 205 near the top of the side portions 206. Below the rims they are laterally engaged by precision ball bearing rollers 207 on stub shafts 208 supported in the cross slide (Figures 17 and 18). One of the stub shafts 208 is mounted in a journal 210 held by a set screw 211 in a particular angular position and supports the roller eccentric to the axis of the stub shaft as shown at 212 in Figure 18. An outboard support for the roller is provided by a strap 213 secured to the cross slide. Adjustment of the distances between the rollers is thus achieved by loosening the set screws 211 and turning the stub shaft to change the eccentric adjustment.

The position of the cross slide can be clamped along the gauge bar at any desired point by manipulating operating handle 214 to turn shaft 215 in journal 216 in cross slide 197 (Figure 19). A clamping cam 217 on the lower end of the shaft 215 engages a resilient shoe 218 held in place by the cross slide and riding against the side 206 of the gauge bar below the rim 205. The clamping pressure of the cam 217 is borne at the opposite side of the cross slide by fixed clamping jaw 220 fastened as by screw 221 to the cross slide.

Work holders are adjustably secured along the cross slide by laterally extending T-slot support 222 (best seen in Figures 10, 11, 15, 16, 17, 19 and 20) which is fixedly mounted parallel to the side of the cross slide adjoining the punch, and receives slidable work holder mounting 223 (Figures 10, 11 and 20). The work holder mounting 223 has a tongue 224 which rides in the T slot of the support 222 and a cooperating mounting base 225 outside the T slot and united in clamping relation to the tongue by bolts 226. Brackets 227 are secured to the base by bolts 228, forming lateral guiding surfaces 230 for the work holder clamps. The position of one of the brackets is made adjustable by an adjusting screw 231 operating in a lug 232 secured to the work holder mounting base 225 at one side. Elongated slots for the bolts 228 permit slight adjustment.

Extending vertically transversely to the bed in the work holder mounting base are guideways 233 on either side of the guide surfaces 230, which receive a pin 234 which supports and positions the end remote from the work of lower clamping jaw 235. The freedom of pin 234 in the guideways is limited at the bottom by pin 236 and at the top by pin 237 extending into one of the guideways. As seen in Figure 12, the lower clamping jaw 235 is of channel cross section at its inner end and has a wear plate 238 held in position by a cross pin 240. At the outer end, the lower clamping jaw has a jaw extension 241 which is flat rather than channelled. The channelled side portions 242 of the lower clamping jaw end in a locating surface 243 which extends parallel to the gauge bar and transversely to the rails and forms a longitudinal work locating surface which bears a predetermined relationship to the stylus, the punch axis and the template locating surfaces as later explained.

Pivoted in the lower clamping jaw by a pin 244, an upper clamping jaw 245 extends outwardly toward the work at 246 cooperating with the lower portion 241 beyond the longitudinal work locating surface to engage the work 247, suitably a metallic sheet (or in the case of making a template, it engages the template). The rearward end of the work holder jaw 245 has pivot ears 248 (Figures 10 to 12) which journal a clamping trunnion 250. Between the ears a clamping screw 251 extends into a threaded opening through the trunnion and at the far side of the trunnion is adapted to engage the wear strip 238 to bring pressure between the clamping jaws. The clamping screw can screw in and out and also swing like a lever with the trunnion for quick clamping and unclamping.

Positioned on the cross slide at a predetermined position as later described, a lateral work locating wall (best seen in Figures 22 and 23) is provided at 252, having a lateral work locating surface 253 which is parallel to the rails and transverse to the longitudinal work locating surface. While this work locating wall is of L form, the longitudinal surface 254 is not intended to engage the work.

For the purpose of adjustment, a work locator carrier 255 is mounted on the end of support 222 by screws 256 and alignment pin 257 (Figures 22 and 23). The carrier 255 is of a yoke form with arms 258 which engage on either side of a lateral locator wall holder 260. The holder 260 is of U form, having arms 261 which closely engage lateral locator wall 252 and supporting a pin 262 (Figure 23) which pivots the locator wall so that it can be swung out of the way to prevent its getting under the punch when punching is to be done at the corner of the work sheet adjacent the work locator. A button 263 prevents the locator from being pushed under a punch and this warns the operator to swing the locator out of the way on its pivot.

The adjustment of carrier 260 is provided by adjusting screws 264 in arms 258, which screws are held in adjusted position by locking screws 265. Locking screws 266 in elongated slots hold carrier 260 in adjusted position.

Figure 21:
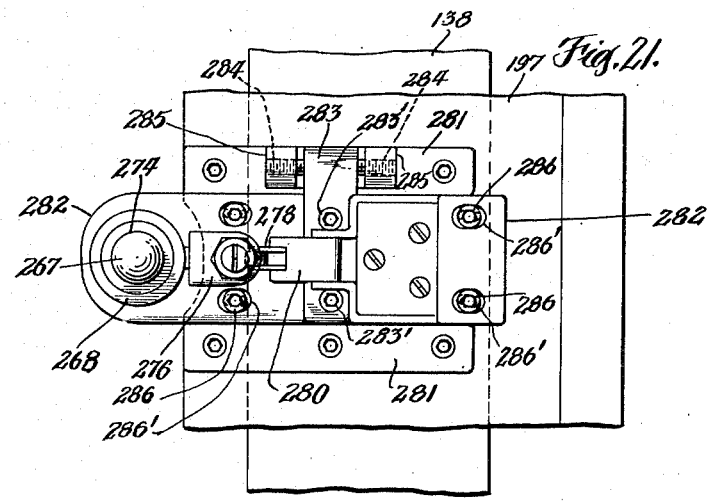
Figure 21 is a top plan view of Figure 20.

A stylus 267 is mounted on the cross slide in an upright stylus guide 268. This construction is seen in Figures 1, 2 and 3 but is best seen in Figures 20 and 21. The stylus has a reduced forward end 270 (Figure 20) which snugly fits in the template openings 124 and has a suitably tapered or crowned lower end formation 271 which readily guides the stylus in entering one of the locating openings. The stylus is movable downwardly and in retraction in its guide 268, being urged toward retracted position by compression spring 272 acting between spring shoulder 273 in the guide and the upper head 274 of the stylus. A side slot 275 in the guide supports switch abutment bracket 276 which has the desired range of movement of the stylus and is secured to the side of the stylus. A switch abutment shown at 277 is adjustably mounted on the bracket 276. As the switch abutment 277 moves down it engages switch operator 278, closing switch 280 (Figures 20, 21 and 30) when the stylus has entered a predeteremined amount into one of the locating openings of the template.

The upright stylus guide 268 is secured by means of a key 268′ and nut 268² in a supporting plate 282 adjustably mounted on the cross slide 197. Side guides 281 secured to the cross slide 197, are provided for the supporting plate 282 and one of the guides is provided with spaced ears 285, between which, a cross bar 283 secured to the plate 282 by screws 283, extends. Adjusting screws 284 carried by the ears 285 engage the bar 283 to enable accurate adjustment of the stylus in a direction toward and away from the cross bar 197 and after adjustment the plate is locked to the cross bar by screws 286 passing through shoulder slots 286′ in the plate 282. The switch 280 is mounted on the stylus supporting plate 282.

The template may be manufactured in any suitable manner such as hand drilling or jig drilling, but in many cases it is desirable to provide a template punch and die combination on the turrets and to manufacture the template by punching. For this purpose it is desirable to provide on the table (or on one of the tables where several machines are employed) means for accurate location of the position of the work by measurement. Accordingly I show in Figure 27 a modified form of table construction in which precision measuring equipment has been provided to locate any given point on the template with reference to the axis of punching. I here show a scale 287 on the bed extending longitudinally preferably near one rail, cooperating with a vernier index 288 mounted on the gauge bar and permitting the exact measurement of any gauge bar longitudinal position and accordingly of the template position as later explained. Likewise the cross slide position is accurately located, since a scale 290 extends laterally on the top of the gauge bar and a vernier index 291 is mounted on the cross slide cooperating with the scale 290 to locate the position of the cross slide precisely.

In the normal operation of the machine and also in the use of the machine for making the template, certain dimensions are important as set forth on Figure 3. The projected distance A from the longitudinal template locating surface 118 to the axis of the operating tool (punch) at 46 should equal the projected distance $a$ from the longitudinal work locating surface 243 to the axis of the stylus. These distances should preferably extend in opposite directions with respect to the stylus and axis. Likewise the projected distance B from the lateral template locating surface 122 to the axis 46 of the operating tool should equal the projected distance $b$ from the lateral work locating surface 253 to the axis of the stylus. These distances preferably extend in opposite directions with respect to the stylus and axis. These respective distances remain the same throughout the operation of the machine and are highly important features in the useful application of the invention.

It will be evident that the dimensions are desirably oppositely measured with respect to the stylus and punch axis. Thus the dimensions from the stylus to the longitudinal work locating surface is measured forwardly and the dimension from the tool axis to the longitudinal template locating surface is measured rearwardly. Likewise the dimension from the tool axis to the lateral template locating surface is measured to the right and the dimension from the stylus to the lateral work locating surface is measured to the left. It will be of course understood that these relationships can if desired be reversed, but that they should in the preferred embodiment be opposite.

Figure 30:
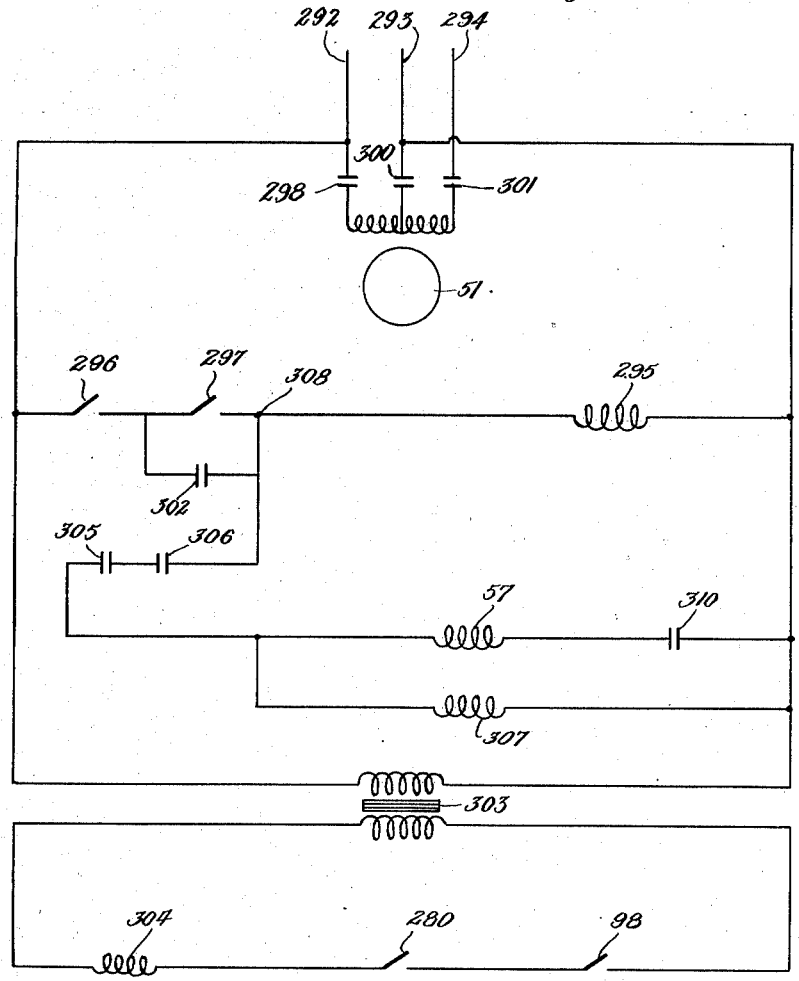
Figure 30 is a circuit diagram illustrative of the electrical connections which may be employed.

Figure 30 illustrates an electric circuit which may usefully be applied in the invention, it being understood of course that other suitable electric circuits can be employed if desired.

As shown the motor 51 of any suitable type is connected to three phase alternating current power leads 292, 293 and 294 through any main switching mechanism not shown. Any suitable starter system for the motor may be employed, the one shown being of conventional character comprising a starter relay coil 295 in series with a manual stop switch 296 (normally closed) and a manual start switch 297 (normally open) across the leads 292 and 293. The starter has normally open starter contacts 298, 300 and 301 in series with the respective line connections to the motor 51. The starter also has a maintaining contact 302 which shunts the manual motor starting switch 297 when the motor is operating.

A suitable step down transformer 303 is connected across the power leads 292 and 293 and the secondary of the transformer is in series with the electromagnet coil 304 of a power relay, and with stylus switch 280 and locator pin switch 98 as already described. Power relay 304 has normally open contacts 305 and 306 in series with time relay electromagnet 307 between power lead 293 and point 308 intermediate between starter coil 295 and manual starting switch 297. The time relay may suitably be of the hydraulic type which remains energized for a predetermined time long enough to complete one punching operation and then deenergizes. When the time relay is energized time relay contacts 310 are closed, energizing clutch solenoid 57 in series with power relay contacts 305, 306, maintaining contact 302 of the starter in closed position, and manual motor stop switch 296 which is then closed.

In operation it will be understood that the machine will be set up suitably level and the tools in the turrets will be adjusted for the required character of the work, placing the proper sizes of punch and die sets in each position. Access for tool changing is facilitated by removing plate 311 (Figure 2) from one side of the bed near the turrets.

A template can be made by drilling on independent equipment and marking the same indicia on all template openings which correspond to work holes of the same size. Similar indicia will be marked on one of the turrets at the locations of punches of that size. All openings on the template which correspond to work holes of the same size will be joined with lines of the color chosen for the indicia of such holes. In locating the route to be followed from one hole to the next, advantage may be taken of ability to clamp the cross slide or the gauge bar so that the gauge mechanism will move only longitudinally or only transversely parallel to or at right angles to the rails. Thus several holes in perfect alignment can be reached with a minimum of trial and error. When the clamps are unlocked, the stylus can of course move in any direction over the bed.

In initially adjusting the machine, care should be used that all of the punches properly align with the dies when the locator pins have entered the proper locator sockets. The locating surfaces for the template and for the work should of course be properly placed to maintain the relationships already described. Each of the adjustments should be properly made so that all parts work freely without play. Thus as shown in Figures 6 to 8, the rollers which engage the sides of the rails should be adjusted in the trolleys to maintain firm contact without binding. All of the balls on the bed which reduce the friction of moving the work should operate freely. The work holders should be adjusted as to spacing so that they will properly engage the work and the work holder supports should be properly adjusted with respect to the work holder clamps.

The rollers 161 which ride the tracks 152 should be adjusted as to height to prevent distortion and provide adequate support for the gauge bar.

Adjustment should also be made of the position of the lateral rollers engaging the sides of the gauge bar from the cross slide.

Adjustment should be made of the position of the template with respect to the cross slide and the lateral locating surface should be properly adjusted on the cross slide.

Once all adjustments have been made, a check should be made to be sure that the longitudinal locating surface of the template is at the same projected distance from the tool axis as the longitudinal locating surface of the work is from the stylus, and if any difference exists this should be corrected, conveniently by readjusting the stylus position. Likewise a check should be made to be sure that the lateral locating surface of the template is the same distance from the tool axis as the lateral locating surface of the work is from the stylus, and if any difference exists the lateral work locating surface should be readjusted.

With these preparations complete, the template is clamped on the bed in proper engagement of its discs 120 and 123 with the longitudinal and lateral template locating surfaces. The template will then remain in this position during the production of all of the work to be done from that template.

The operator will then clamp the work in the work clamps, engaging the work against the longitudinal and lateral locating surfaces as already explained.

With the pins 75 and 76 withdrawn, the turrets are turned by the hand wheel 67 until the proper punch and die combination are brought to the operative position 46. At this point the user releases the foot pedal 86 and allows the locator pins to enter the socket 74 at the backs of the turrets, positioning the correct tools in operative position with the T slot 45 in the crosshead 47.

The motor can now be started by closing manual starting switch 297 and it will continue to operate during the normal operation of the machine. The user then moves the stylus to a position to enter the first of the template openings having indicia corresponding to that at 132 at the appropriate punch which is in position to operate. Normally both the cross slide and gauge bar will be unclamped, although if a straight run exists as at the right hand side of the template in Figure 3, one or the other of the clamps may be tightened to facilitate operation. When the position of the first opening is reached the user presses down on the stylus until it enters and snugly fills the template opening. When this occurs the work is at the exact corresponding position with respect to the reference surfaces of the cross slide and with respect to the punch which the template is with respect to the template reference surfaces and to the stylus.

As the user presses down with the stylus to make it enter the locating hole in the template, stylus switch 230 is closed. Switch 98 was closed by the pins 75 moving into engaging position, and is in series with switch 230 (Figure 28) and therefore power relay 304 is energized closing power relay contacts 305 and 306 in series with closed maintaining contact 302 of the starter and closed switch 296 to energize time relay 307. Time relay 307 remains closed for a definite short duration (normally a matter of seconds required for the operation of the punch) and while it is closed time relay contacts 310 are closed which energizes clutch solenoid 57 to engage the clutch, and apply the energy of the motor to the punch crank in the manner described above.

As the punch retracts and tends to bring the work against the stripper 64, the work is free from distortion and able to move upward because the work holders provide freedom for pins 234 to move upward in slots 233. Thus though there is a slight upward deflection, it does not create bumps in the work sheet. The work sheet remains very flat.

The user then moves the stylus to the next hole in the indicated line having the same indicia and repeats the procedure until he has punched each of the holes in succession which are to be punched using the same punch and die. The user then manipulates the turrets to bring the next punch and die combination into operative position and follows the indicia at that die position on the template, using template openings marked with a similar color. This procedure is followed until holes have been punched in the work corresponding to each opening on the template. The work piece is then released from the work holders, a new work piece is inserted and the procedure is repeated for the new work piece. On releasing and refastening the clamps, it is usually only necessary to rock the clamp screws in their trunnions without resetting them.

It will be evident that by the mechanism of the invention the time is cut to a bare minimum, and it is possible to complete the punching operation in a time of a few seconds per hole.

The character of manipulation of the work clamp will depend upon the gauge of the stock. It will be understood that the work clamp as shown in Figure 10 can be screwed down in the angular relation shown and released by unscrewing, or can be set at a position at which it can be pulled clockwise in Figure 10 to lock frictionally and pulled counterclockwise to unlock, thus giving a desirable quick engagement and quick release action.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. In a tool and work table, a machine tool having an axis at a work station, a work table bed extending in front of the tool, rails at either side of the bed, a gauge bar extending over the bed and slidable on the rails, a cross slide slidable on the gauge bar, a longitudinal template locating wall on the bed having a longitudinal template locating surface parallel to the gauge bar, a transverse template locating wall on the bed having a transverse template locating surface, a template in fixed position on the bed engaging the longitudinal and transverse template locating surfaces, a stylus on the cross slide which registers with points on the template, a longitudinal work locating wall on the cross slide having a longitudinal work locating surface parallel to the gauge bar whose projected distance from the center of the stylus is the same as the projected distance from the longitudinal template locating surface to the tool axis, a lateral work locating wall on the cross slide having a lateral work locating surface whose projected distance from the stylus is equal to the projected distance from the lateral template locating surface to the tool axis and means for clamping the work to the cross slide against the lateral and longitudinal work locating surfaces.

2. In a punch and work table, a punch turret on a vertical pivot, a plurality of punches around the punch turret, a die turret on a vertical pivot below the punch turret, a plurality of cooperating dies around the die turret, means for centering the punch and die turrets together on the same punch axis, means for operating a punch on that axis, a work table bed extending in front of the punches, rails on either side of the bed, a gauge bar extending over the bed and slidable on the rails, a cross slide slidable on the gauge bar, a longitudinal template locating wall on the bed having a longitudinal template locating surface parallel to the gauge bar, a transverse template locating wall on the bed having a transverse template locating surface, a template in fixed position on the bed engaging the longitudinal and transverse template locating surfaces, a stylus on the cross slide which registers with points on the template, a longitudinal work locating wall on the cross slide having a longitudinal work locating surface parallel to the gauge bar whose projected distance from the center of the stylus is the same as the projected distance from the longitudinal template locating surface to the axis, a lateral work locating wall on the cross slide having a lateral work locating surface whose projected distance from the stylus is equal to the projected distance from the lateral template locating surface to the axis, and means for clamping the work to the cross slide against the lateral and longitudinal work locating surfaces.

3. In a tool and work table, a machine tool having an axis at a work station, a work table bed extending in front of the tool, rails at either side of the bed, a gauge bar extending over the bed and slidable on the rails, a cross slide slidable on the gauge bar, a longitudinal template locating wall on the bed having a longitudinal template locating surface parallel to the gauge bar, a transverse template locating wall on the bed having a transverse template locating surface, a template in fixed position on the bed engaging the longitudinal and transverse template locating surfaces and having a plurality of locating openings of the same size, a stylus on the cross slide which snugly fits in the locating openings, a sliding guide in which the stylus slides and which permits the stylus to move forward and enter one of the openings, a longitudinal work locating wall on the cross slide having a longitudinal work locating surface parallel to the gauge bar whose projected distance from the center of the stylus is the same as the projected distance from the longitudinal template locating surface to the tool axis, a lateral work locating wall on the cross slide having a lateral work locating surface whose projected distance from the stylus is equal to the projected distance from the lateral template locating surface to the tool axis and means for clamping the work to the cross slide against the lateral and longitudinal work locating surfaces.

4. In a tool and work table, a machine tool having an axis at a work station and having an electric operating circuit, a work table bed extending in front of the tool, rails at either side of the bed, a gauge bar extending over the bed and slidable on the rails, a cross slide slidable on the gauge bar, a longitudinal template locating wall on the bed having a longitudinal template locating surface parallel to the gauge bar, a transverse template locating wall on the bed having a transverse template locating surface, a template in fixed position on the bed engaging the longitudinal and transverse template locating surfaces and having a plurality of locating openings of the same size, a stylus on the cross slide which snugly fits in the locating openings, a sliding guide in which the stylus slides and which perimts the stylus to move forward and enter one of the openings, a switch in the machine tool circuit closed by movement of the stylus to enter one of the openings, a longitudinal work locating wall on the cross slide having a longitudinal work locating surface parallel to the gauge bar whose projected distance from the center of the stylus is the same as the projected distance from the longitudinal template locating surface to the tool axis, a lateral work locating wall on the cross slide having a lateral work locating surface whose projected distance from the stylus is equal to the projected distance from the lateral template locating surface to the tool axis and means for clamping the work to the cross slide against the lateral and longitudinal work locating surfaces.

5. In a punch and work table, a punch turret on a vertical pivot, a plurality of punches around the punch turret, a die turret on a vertical pivot below the punch turret, a plurality of cooperating dies around the die turret, means for centering the punch and die turrets together on the same punch axis, means for operating a punch on that axis, a work table bed extending in front of the punches, rails on either side of the bed, a gauge bar extending over the bed and slidable on the rails, a cross slide slidable on the gauge bar, a longitudinal template locating wall on the bed having a longitudinal template locating surface parallel to the gauge bar, a transverse template locating wall on the bed having a transverse template locating surface, a template in fixed position on the bed engaging the longitudinal and transverse template locating surfaces and having a plurality of locating openings of the same size, a stylus on the cross slide which snugly fits in the locating openings, a sliding guide in which the stylus slides and which permits the stylus to move forward and enter one of the openings, a longitudinal work locating wall on the cross slide having a longitudinal work locating surface parallel to the gauge bar whose projected distance from the center of the stylus is the same as the projected distance from the longitudinal template locating surface to the axis, a lateral work locating wall on the cross slide having a lateral work locating surface whose projected distance from the stylus is equal to the projected distance from the lateral template locating surface to the axis and means for clamping the work to the cross slide against the lateral and longitudinal work locating surfaces.

6. In a punch and work table, a punch turret on a vertical pivot, a plurality of punches around the punch turret, a die turret on a vertical pivot below the punch turret, a plurality of cooperating dies around the die turret, means for centering the punch and die turrets together on the same punch axis, electrical means including an electric circuit for operating a punch on that axis, a work table bed extending in front of the punches, rails on either side of the bed, a gauge bar extending over the bed and slidable on the rails, a cross slide slidable on the gauge bar, a longitudinal template locating wall on the bed having a longitudinal template locating surface parallel to the gauge bar, a transverse template locating wall on the bed having a transverse template locating surface, a template in fixed position on the bed engaging the longitudinal and transverse template locating surfaces and having a plurality of locating openings of the same size, a stylus on the cross slide which snugly fits in the locating openings, a sliding guide in which the stylus slides and which permits the stylus to move forward and enter one of the openings, a switch in the machine tool circuit closed by movement of the stylus to enter one of the openings, a longitudinal work locating wall on the cross slide having a longitudinal work locating surface parallel to the gauge bar whose projected distance from the center of the stylus is the same as the projected distance from the longitudinal template locating surface to the axis, a lateral work locating wall on the cross slide having a lateral work locating surface whose projected distance from the stylus is equal to the projected distance from the lateral template locating surface to the axis, and means for clamping the work to the cross slide against the lateral and longitudinal work locating surfaces.

7. In a tool and work table, a machine tool having an axis at a work station, a work table bed extending in front of the tool, rails at either side of the bed, a gauge bar extending over the bed and slidable on the rails, a clamp for locking the gauge bar at any position on the rails, a cross slide slidable on the gauge bar, a longitudinal template locating wall on the bed having a longitudinal template locating surface parallel to the gauge bar, a transverse template locating wall on the bed having a transverse template locating surface, a template in fixed position on the bed engaging the longitudinal and transverse template locating surfaces, a stylus on the cross slide which registers with points on the template, a longitudinal work locating wall on the cross slide having a longitudinal work locating surface parallel to the gauge bar whose projected distance from the center of the stylus is the same as the projected distance from the longitudinal template locating surface to the tool axis, a lateral work locating wall on the cross slide having a lateral work locating surface whose projected distance from the stylus is equal to the projected distance from the lateral template locating surface to the tool axis and means for clamping the work to the cross slide against the lateral and longitudinal work locating surfaces.

8. In a tool and work table, a machine tool having an axis at a work station, a work table bed extending in front of the tool, rails at either side of the bed, a gauge bar extending over the bed and slidable on the rails, a cross slide slidable on the gauge bar, a clamp for locking the cross slide at any position on the gauge bar, a longitudinal template locating wall on the bed having a longitudinal template locating surface parallel to the gauge bar, a transverse template locating wall on the bed having a transverse template locating surface, a template in fixed position on the bed engaging the longitudinal and transverse template locating surfaces, a stylus on the cross slide which registers with points on the template, a longitudinal work locating wall on the cross slide having a longitudinal work locating surface parallel to the gauge bar whose projected distance from the center of the stylus is the same as the projected distance from the longitudinal template locating surface to the tool axis, a lateral work locating wall on the cross slide having a lateral work locating surface whose projected distance from the stylus is equal to the projected distance from the lateral template locating surface to the tool axis and means for clamping the work to the cross slide against the lateral and longitudinal work locating surfaces.

9. In a punch and work table, a punch turret on a vertical pivot, a plurality of punches around the punch turret, a die turret on the vertical pivot below the punch turret, a plurality of cooperating dies around the die turret, means for centering the punch and die turrets together on the same punch axis, means for operating a punch on that axis, a work table bed extending in front of the punches, rails on either side of the bed, a gauge bar extending over the bed and slidable on the rails, a clamp for locking the gauge bar at any position on the rails, a cross slide slidable on the gauge bar, a longitudinal template locating wall on the bed having a longitudinal template locating surface parallel to the gauge bar, a transverse template locating wall on the bed having a transverse template locating surface, a template in fixed position on the bed engaging the longitudinal and transverse template locating surfaces, a stylus on the cross slide which registers with points on the template, a longitudinal work locating wall on the cross slide having a longitudinal work locating surface parallel to the gauge bar whose projected distance from the center of the stylus is the same as the projected distance from the longitudinal template locating surface to the axis, a lateral work locating wall on the cross slide having a lateral work locating surface whose projected distance from the stylus is equal to the projected distance from the lateral template locating surface to the axis, and means for clamping the work to the cross slide against the lateral and longitudinal work locating surfaces.

10. In a punch and work table, a punch turret on a vertical pivot, a plurality of punches around the punch turret, a die turret on the vertical pivot below the punch turret, a plurality of cooperating dies around the die turret, means for centering the punch and die turrets together on the same punch axis, means for operating a punch on that axis, a work table bed extending in front of the punches, rails on either side of the bed, a gauge bar extending over the bed and slidable on the rails, a cross slide slidable on the gauge bar, a clamp for locking the cross slide at any position on the gauge bar, a longitudinal template locating wall on the bed having a longitudinal template locating surface parallel to the gauge bar, a transverse template locating wall on the bed having a transverse template locating surface, a template in fixed position on the bed engaging the longitudinal and transverse template locating surfaces, a stylus on the cross slide which regsisters with points on the template, a longitudinal work locating wall on the cross slide having a longitudinal work locating surface parallel to the gauge bar whose projected distance from he center of the stylus is the same as the projected distance from the longitudinal template locating surface to the axis, a lateral work locating wall on the cross slide having a lateral work locating surface whose projected distance from the stylus is equal to the projected distance from the lateral template locating surface to the axis, and means for clamping the work to the cross slide against the lateral and longitudinal work locating surfaces.

11. In a tool and work table, a machine tool having an axis at a work station, a work table bed extending in front of the tool, rails at either side of the bed, a gauge bar extending over the bed and slidable on the rails, a clamp for locking the gauge bar at any position on the rails, a cross slide slidable on the gauge bar, a longitudinal template locating wall on the bed having a longitudinal template locating surface parallel to the gauge bar, a transverse template locating wall on the bed having a transverse template locating surface, a template in fixed position on the bed engaging the longitudinal and transverse template locating surfaces and having a plurality of locating openings of the same size, a stylus on the cross slide which snugly fits in the locating openings, a sliding guide in which the stylus slides and which permits the stylus to move forward and enter one of the openings, a longitudinal work locating wall on the cross slide having a longitudinal work locating surface parallel to the gauge bar whose projected distance from the center of the stylus is the same as the projected distance from the longitudinal template locating surface to the tool axis, a lateral work locating wall on the cross slide having a lateral work locating surface whose projected distance from the stylus is equal to the projected distance from the lateral template locating surface to the tool axis and means for clamping the work to the cross slide against the lateral and longitudinal work locating surfaces.

12. In a tool and work table, a machine tool having an axis at a work station, a work table bed extending in front of the tool, rails at either side of the bed, a gauge bar extending over the bed and slidable on the rails, a cross slide slidable on the gauge bar, a clamp for locking the cross slide at any position on the gauge bar, a longitudinal template locating wall on the bed having a longitudinal template locating surface parallel to the gauge bar, a transverse template locating wall on the bed having a transverse template locating surface, a template in fixed position on the bed engaging the longitudinal and transverse template locating surfaces and having a plurality of locating openings of the same size, a stylus on the cross slide which snugly fits in the locating openings, a sliding guide in which the stylus slides and which permits the stylus to move forward and enter one of the openings, a longitudinal work locating wall on the cross slide having a longitudinal work locating surface parallel to the gauge bar whose projected distance from the center of the stylus is the same as the projected distance from the longitudinal template locating surface to the tool axis, a lateral work locating wall on the cross slide having a lateral work locating surface whose projected distance from the stylus is equal to the projected distance from the lateral template locating surface to the tool axis and means for clamping the work to the cross slide against the lateral and longitudinal work locating surfaces.

13. In a tool and work table, a machine tool having an axis at a work station and having an electric operating circuit, a work table bed extending in front of the tool, rails at either side of the bed, a gauge bar extending over the bed and slidable on the rails, a clamp for locking the gauge bar at any position on the rails, a cross slide slidable on the gauge bar, a longitudinal template locating wall on the bed having a longitudinal template locating surface parallel to the gauge bar, a transverse template locating wall on the bed having a transverse template locating surface, a template in fixed position on the bed engaging the longitudinal and transverse template locating surfaces and having a plurality of locating openings of the same size, a stylus on the cross slide which snugly fits in the locating openings, a sliding guide in which the stylus slides and which permits the stylus to move forward and enter one of the openings, a switch in the machine tool circuit closed by movement of the stylus to enter one of the openings, a longitudinal work locating wall on the cross slide having a longitudinal work locating surface parallel to the gauge bar whose projected distance from the center of the stylus is the same as the projected distance from the longitudinal template locating surface to the tool axis, a lateral work locating wall on the cross slide having a lateral work locating surface whose projected distance from the stylus is equal to the projected distance from the lateral template locating surface to the tool axis and means for clamping the work to the cross slide against the lateral and longitudinal work locating surfaces.

14. In a tool and work table, a machine tool having an axis at a work station and having an electric operating circuit, a work table bed extending in front of the tool, rails at either side of the bed, a gauge bar extending over the bed and slidable on the rails, a cross slide slidable on the gauge bar, a clamp for locking the cross slide at any position on the gauge bar, a longitudinal template locating wall on the bed having a longitudinal template locating surface parallel to the gauge bar, a transverse template locating wall on the bed having a transverse template locating surface, a template in fixed position on the bed engaging the longitudinal and transverse template locating surfaces and having a plurality of locating openings of the same size, a stylus on the cross slide which snugly fits in the locating openings, a sliding guide in which the stylus slides and which permits the stylus to move forward and enter one of the openings, a switch in the machine tool circuit closed by movement of the stylus to enter one of the openings, a longitudinal work locating wall on the cross slide having a longitudinal work locating surface parallel to the gauge bar whose projected distance from the center of the stylus is the same as the projected distance from the longitudinal template locating surface to the tool axis, a lateral work locating wall on the cross slide having a lateral work locating surface whose projected distance from the stylus is equal to the projected distance from the lateral template locating surface to the tool axis and means for clamping the work to the cross slide against the lateral and longitudinal work locating surfaces.

15. In a punch and work table, a punch turret on a vertical pivot, a plurality of punches around the punch turret, a die turret on a vertical pivot below the punch turret, a plurality of cooperating dies around the die turret, means for centering the punch and die turrets together on the same punch axis, electrical means including an electric circuit for operating a punch on that axis, a work table bed extending in front of the punches, rails on either side of the bed, a gauge bar extending over the bed and slidable on the rails, a clamp for locking the gauge bar at any position on the rails, a cross slide slidable on the gauge bar, a longitudinal template locating wall on the bed having a longitudinal template locating surface parallel to the gauge bar, a transverse template locating wall on the bed having a transverse template locating surface, a template in fixed position on the bed engaging the longitudinal and transverse template locating surfaces and having a plurality of locating openings of the same size, a stylus on the cross slide which snugly fits in the locating openings, a sliding guide in which the stylus slides and which permits the stylus to move forward and enter one of the openings, a switch in the machine tool circuit closed by movement of the stylus to enter one of the openings, a longitudinal work locating wall on the cross slide having a longitudinal work locating surface parallel to the gauge bar whose projected distance from the center of the stylus is the same as the projected distance from the longitudinal template locating surface to the axis, a lateral work locating wall on the cross slide having a lateral work locating surface whose projected distance from the stylus is equal to the projected distance from the lateral template locating surface to the axis, and means for clamping the work to the cross slide against the lateral longitudinal work locating surfaces.

16. In a punch and work table, a punch turret on a vertical pivot, a plurality of punches around the punch turret, a die turret on a vertical pivot below the punch turret, a plurality of cooperating dies around the die turret, means for centering the punch and die turrets together on the same punch axis, electrical means including an electric circuit for operating a punch on that axis, a work table bed extending in front of the punches, rails on either side of the bed, a gauge bar extending over the bed and slidable on the rails, a cross slide slidable on the gauge bar, a clamp for locking the cross slide at any position on the gauge bar, a longitudinal template locating wall on the bed having a longitudinal template locating surface parallel to the gauge bar, a transverse template locating wall on the bed having a transverse template locating surface, a template in fixed position on the bed engaging the longitudinal and transverse template locating surfaces and having a plurality of locating openings of the same size, a stylus on the cross slide which snugly fits in the locating openings, a sliding guide in which the stylus slides and which permits the stylus to move forward and enter one of the openings, a switch in the machine tool circuit closed by movement of the stylus to enter one of the openings, a longitudinal work locating wall on the cross slide having a longitudinal work locating surface parallel to the gauge bar whose projected distance from the center of the stylus is the same as the projected distance from the longitudinal template locating surface to the axis, a lateral work locating wall on the cross slide having a lateral work locating surface whose projected distance from the stylus is equal to the projected distance from the lateral template locating surface to the axis, and means for clamping the work to the cross slide against the lateral and longitudinal work locating surfaces.

17. In a punch and work table, a punch turret on a vertical pivot, a plurality of punches around the punch turret, indicia individual to each of the punches which is different, marked on the punch turret, a die turret on a vertical pivot below the punch turret, a plurality of cooperating dies around the die turret, means for centering the punch and die turrets together on the same punch axis, means for operating a punch on that axis, a work table bed extending in front of the punches, rails on either side of the bed, a gauge bar extending over the bed and slidable on the rails, a cross slide slidable on the gauge bar, a longitudinal template locating wall on the bed having a longitudinal template locating surface parallel to the gauge bar, a transverse template locating wall on the bed having a transverse template locating surface, a template in fixed position on the bed engaging the longitudinal and transverse template locating surfaces, indications on the template of the locations of punching holes corresponding to the holes produced in the work by the various punches, indicia on the indications corresponding to the indicia at the corresponding punches on the turret, a stylus on the cross slide which registers with the indications on the template, a longitudinal work locating wall on the cross slide having a longitudinal work locating surface parallel to the gauge bar whose projected distance from the center of the stylus is the same as the projected distance from the longitudinal template locating surface to the axis, a lateral work locating wall on the cross slide having a lateral work locating surface whose projected distance from the stylus is equal to the projected distance from the lateral template locating surface to the axis and means for clamping the work to the cross slide against the lateral and longitudinal work locating surfaces.

18. In a punch and work table, a punch turret on a vertical pivot, a plurality of punches around the punch turret, indicia individual to each of the punches which is different, marked on the punch turret, a die turret on a vertical pivot below the punch turret, a plurality of cooperating dies around the die turret, means for centering the punch and die turrets together on the same punch axis, means for operating a punch on that axis, a work table bed extending in front of the punches, rails on either side of the bed, a gauge bar extending over the bed and slidable on the rails, a cross slide slidable on the gauge bar, a longitudinal template locating wall on the bed having a longitudinal template locating surface parallel to the gauge bar, a transverse template locating wall on the bed having a transverse template locating surface, a template in fixed position on the bed engaging the longitudinal and transverse template locating surfaces, indications on the template of the locations of punching holes corresponding to the holes produced in the work by the various punches, indicia on the indications corresponding to the indicia at the corresponding punches on the turret, lines connecting the indications on the template which correspond to the locations of holes made by the same punch, a stylus on the cross slide which registers with the indications on the template, a longitudinal work locating wall on the cross slide having a longitudinal work locating surface parallel to the gauge bar whose projected distance from the center of the stylus is the same as the projected distance from the longitudinal template locating surface to the axis, a lateral work locating wall on the cross slide having a lateral work locating surface whose projected distance from the stylus is equal to the projected distance from the lateral template locating surface to the axis, and means for clamping the work to the cross slide against the lateral and longitudinal work locating surfaces.

19. In a punch and work table, a punch turret on a vertical pivot, a plurality of punches around the punch turret, indicia individual to each of the punches which is different, marked on the punch turret, a die turret on a vertical pivot below the punch turret, a plurality of cooperating dies around the die turret, means for centering the punch and die turrets together on the same punch axis, means for operating a punch on that axis, a work table bed extending in front of the punches, rails on either side of the bed, a gauge bar extending over the bed and slidable on the rails, a cross slide slidable on the gauge bar, a longitudinal template locating wall on the bed having a longitudinal template locating surface parallel to the gauge bar, a transverse template locating wall on the bed having a transverse template locating surface, a template in fixed position on the bed engaging the longitudinal and transverse template locating surfaces and having holes all of the same size, some of which correspond to locations of holes in the work of one size and others of which correspond to locations of holes in the work of other sizes made by the various punches, indicia on the template holes which correspond to those applied to the punch which is to make the holes in the work at the corresponding locations, a stylus on the cross slide which in one position moves into and snugly fits in the selected holes in the template, a longitudinal work locating wall on the cross slide having a longitudinal work locating surface parallel to the gauge bar whose projected distance from the center of the stylus is the same as the projected distance from the longitudinal template locating surface to the axis, a lateral work locating wall on the cross slide having a lateral work locating surface whose projected distance from the stylus is equal to the projected distance from the lateral template locating surface to the axis, and means for clamping the work to the cross slide against the lateral and longitudinal work locating surfaces.

20. In a punch and work table, a punch turret on a vertical pivot, a plurality of punches around the punch turret, a die turret on a vertical pivot below the punch turret, a plurality of cooperating dies around the die turret, means for centering the punch and die turrets together on the same punch axis, means for operating a punch on that axis, a work table bed extending in front of the punches, rails on either side of the bed, a gauge bar extending over the bed and slidable on the rails, a cross slide slidable on the gauge bar, a longitudinal template locating wall on the bed having a longitudinal template locating surface parallel to the gauge bar, a transverse template locating wall on the bed having a transverse template locating surface, a template in fixed position on the bed engaging the longitudinal and transverse template locating surfaces, a stylus on the cross slide which registers with points on the template, work clamp holders on the cross slide having clamp guideways extending away from the bed, work clamps having guides free to move in the clamp guideways, walls on the work clamps forming a longitudinal work locating surface parallel to the gauge bar whose projected distance from the center of the stylus is the same as the projected distance from the longitudinal template locating surface to the axis, pivoted jaws extending out from the work clamps beyond the longitudinal work locating surface, a trunnion on one of each pair of jaws, a clamp screw threaded through each trunnion and applying pressure between the jaws, and a lateral work locating wall on one of the work clamps having a lateral work locating surface whose projected distance from the stylus is equal to the projected distance from the lateral template locating surface to the axis.

21. In a punch and work table, a punch turret on a vertical pivot, a plurality of punches mounted around the punch turret, a die turret on a vertical pivot below the punch turret, a plurality of cooperating dies mounted around the die turret, means for centering the punch and die turrets together on the same punch axis, means for operating the punch on that axis, a work table bed extending in front of the punches, rails on either side of the bed, a gauge bar extending over the bed and sliding on the rails, a cross slide slidable on the gauge bar, a longitudinal template locating wall on the bed having a longitudinal template locating surface parallel to the gauge bar, a transverse template locating wall on the bed having a transverse template locating surface, a template in fixed position on the bed engaging the longitudinal and transverse template locating surfaces, a stylus on the cross slide which registers with points on the template, a longitudinal work locating wall on the cross slide having a longitudinal work locating surface parallel to the gauge bar, whose projected distance from the center of the stylus is the same as the projected distance from the longitudinal template locating surface to the axis, a lateral work locating wall on the cross slide having a lateral work locating surface whose projected distance from the stylus is equal to the projected distance from the lateral template locating surface to the axis, an adjustment of the lateral position of the lateral work locating wall with respect to the cross slide, and means for clamping the work to the cross slide against the lateral and longitudinal work locating surfaces.

22. In a punch and work table, a punch turret and a vertical pivot, a plurality of punches mounted around the punch turret, a die turret on a vertical pivot below the punch turret, a plurality of cooperating dies mounted around the die turret, means for centering the punch and die turrets together on the same punch axis, means for operating the punch on that axis, a work table bed extending in front of the punches, rails on either side of the bed, a gauge bar extending over the bed and sliding on the rails, a cross slide slidable on the gauge bar, a longitudinal template locating wall on the bed having a longitudinal template locating surface parallel to the gauge bar, a transverse template locating wall on the bed having a transverse template locating surface, a template in fixed position on the bed engaging the longitudinal and transverse template locating surfaces, a stylus on the cross slide which registers with points on the template, a longitudinal work locating wall on the cross slide having a longitudinal work locating surface parallel to the gauge bar, whose projected distance from the center of the stylus is the same as the projected distance from the longitudinal template locating surface to the axis, a lateral work locating wall on the cross slide having a lateral work locating surface whose projected distance from the stylus is equal to the projected distance from the lateral template locating surface to the axis, an adjustment of the lateral position of the lateral work locating wall with respect to the cross slide, a pivotal mounting for the lateral work locating wall on the cross slide on an axis parallel to the length of the gauge bar, and means for clamping the work to the cross slide against the lateral and longitudinal work locating surfaces.

23. In a punch and work table, a punch turret on a vertical pivot, a plurality of punches mounted around the punch turret, a die turret on a vertical pivot below the punch turret, a plurality of cooperating dies mounted around the die turret, means for centering the punch and die turrets together on the same punch axis, means for operating a punch on that axis, a work table bed extending in front of the punches, rails on either side of the bed, a gauge bar extending over the bed and slidable on the rails, a cross slide slidable on the gauge bar, a longitudinal template locating wall on the bed having a longitudinal template locating surface parallel to the gauge bar, a transverse template locating wall on the bed having a transverse template locating surface, a stylus on the cross slide adapted to register with points on the template when the template is positioned against the template locating surfaces, a longitudinal work locating wall on the cross slide, and a longitudinal work locating surface parallel to the gauge bar, whose projected distance from the center of the stylus is the same as the projected distance from the longitudinal template locating surface to the axis, a lateral work locating wall on the cross slide having a lateral work locating surface whose projected distance from the stylus is equal to the projected distance from the lateral template locating surface to the axis, means for clamping the work and alternatively the template on the cross slide, a scale and index cooperating between the bed and the gauge bar for locating the gauge bar on the bed in cutting the template, and a scale and index cooperating between the gauge bar and the cross slide for locating the cross slide on the gauge bar for cutting the template.

References Cited in the file of this patent

UNITED STATES PATENTS

| Number | Name | Date |
|---|---|---|
| 147,298 | White | Feb. 10, 1874 |
| 756,959 | Herman | Apr. 12, 1904 |
| 808,511 | Cochran | Dec. 26, 1905 |
| 895,944 | Bernard | Aug. 11, 1909 |
| 931,431 | Kilgore | Aug. 17, 1909 |
| 995,411 | Morrill | June 13, 1911 |
| 1,096,271 | Shaffer | May 12, 1914 |
| 1,489,105 | Armington | Apr. 1, 1924 |
| 1,570,928 | Thomas | Jan. 26, 1926 |
| 1,650,748 | Thomas | Nov. 29, 1927 |
| 1,829,358 | Kintner | Oct. 27, 1931 |
| 2,104,185 | Clausen | Jan. 4, 1938 |
| 2,247,437 | Erickson | July 1, 1941 |
| 2,363,208 | Sulzer | Nov. 21, 1944 |
| 2,415,866 | Braun | Feb. 18, 1947 |
| 2,473,764 | Park | June 21, 1949 |
| 2,508,837 | Peffers | May 23, 1950 |